United States Patent [19]
Krieger

[11] Patent Number: 5,755,973
[45] Date of Patent: *May 26, 1998

[54] PORTABLE WASTEWATER TREATMENT METHOD

[75] Inventor: Joseph P. Krieger, Guthrie, Okla.

[73] Assignee: JTJ Systems, Inc., Oklahoma City, Okla.

[*] Notice: The term of this patent shall not extend beyond the expiration date of Pat. No. 5,534,159.

[21] Appl. No.: 630,855

[22] Filed: Mar. 20, 1996

Related U.S. Application Data

[63] Continuation of Ser. No. 300,686, Sep. 2, 1994, Pat. No. 5,534,159, which is a continuation-in-part of Ser. No. 100,876, Aug. 1, 1993, which is a continuation of Ser. No. 969,615, Oct. 30, 1992, Pat. No. 5,288,787, which is a continuation of Ser. No. 616,583, Nov. 21, 1990, Pat. No. 5,173,184.

[51] Int. Cl.$^6$ ............................................. C02F 1/24
[52] U.S. Cl. ............... 210/704; 210/712; 210/765; 210/769; 210/776; 210/805; 210/910
[58] Field of Search ................................. 210/704, 705, 210/710, 712, 718, 721, 738, 758, 765, 768, 769, 776, 800, 803, 805, 806, 910

[56] References Cited

U.S. PATENT DOCUMENTS

| | | | |
|---|---|---|---|
| 832,914 | 10/1906 | Law | 210/5 |
| 1,314,955 | 9/1919 | Flicker | 210/5 |
| 1,440,254 | 12/1922 | Travers | 210/5 |
| 2,799,645 | 7/1957 | Musgrove | 210/42 |
| 3,056,749 | 10/1962 | Griffith | 252/361 |
| 3,133,017 | 5/1964 | Lambeth | 210/5 |
| 3,355,023 | 11/1967 | Foster | 210/195 |
| 3,515,278 | 6/1970 | Wilson | 210/109 |
| 3,694,353 | 9/1972 | Yang et al. | 210/7 |
| 3,735,870 | 5/1973 | Uden | 210/138 |
| 3,787,316 | 1/1974 | Brink et al. | 210/6 |
| 3,820,659 | 6/1974 | Parlette | 210/195 |
| 3,898,159 | 8/1975 | Okabe et al. | 210/44 |
| 3,945,918 | 3/1976 | Kirk | 210/44 |
| 4,021,347 | 5/1977 | Teller et al. | 210/195 |
| 4,092,249 | 5/1978 | La Gatta | 210/195 |
| 4,116,835 | 9/1978 | Bertelson | 210/100 |
| 4,203,837 | 5/1980 | Hoge et al. | 210/44 |
| 4,278,546 | 7/1981 | Roesler | 210/626 |
| 4,344,845 | 8/1982 | Pielkenrood | 210/199 |
| 4,378,290 | 3/1983 | Kennedy, Jr. | 210/103 |
| 4,462,903 | 7/1984 | Wettengl | 210/150 |
| 4,618,430 | 10/1986 | Favret, Jr. et al. | 210/703 |
| 4,624,791 | 11/1986 | Ferriss | 210/704 |
| 4,659,458 | 4/1987 | Chin et al. | 209/164 |
| 4,800,025 | 1/1989 | Bibaeff | 210/703 |
| 4,950,396 | 8/1990 | Skaar et al. | 210/195 |
| 5,076,937 | 12/1991 | Montgomery | 210/705 |
| 5,173,184 | 12/1992 | Krieger | 210/195 |
| 5,308,499 | 5/1994 | Dixon et al. | 210/705 |
| 5,433,863 | 7/1995 | Braden et al. | 210/708 |

Primary Examiner—Thomas G. Wyse
Attorney, Agent, or Firm—Dunlap & Codding, P.C.

[57] ABSTRACT

A portable wastewater treatment system for recycling an aqueous surfactant solution utilized in a parts washer assembly for cleaning parts. The system including a contaminated solution storage tank, a treated solution storage tank, and a portable wastewater treatment apparatus wherein contaminated aqueous surfactant solution is collected in the contaminated solution storage tank, withdrawn from the contaminated solution storage tank, injected with air and passed into a mixing zone where the mixture is sprayed with water. The treated solution in the mixing zone is passed into a quiescent zone where light sludge is passed to the top of the quiescent zone and heavy sludge is passed to the bottom of the quiescent zone, the treated wastewater being disposed between the light sludge and the heavy sludge and the treated wastewater being passed from the quiescent zone into a discharge zone where the treated wastewater is discharged therefrom. The heavy sludge is selectively discharged from the quiescent zone. The light sludge is passed from the quiescent zone into a light sludge bin where the light sludge is selectively discharged therefrom. The treated solution is passed to the treated solution storage tank to provide a recycled supply of treated cleaning solution.

250 Claims, 11 Drawing Sheets

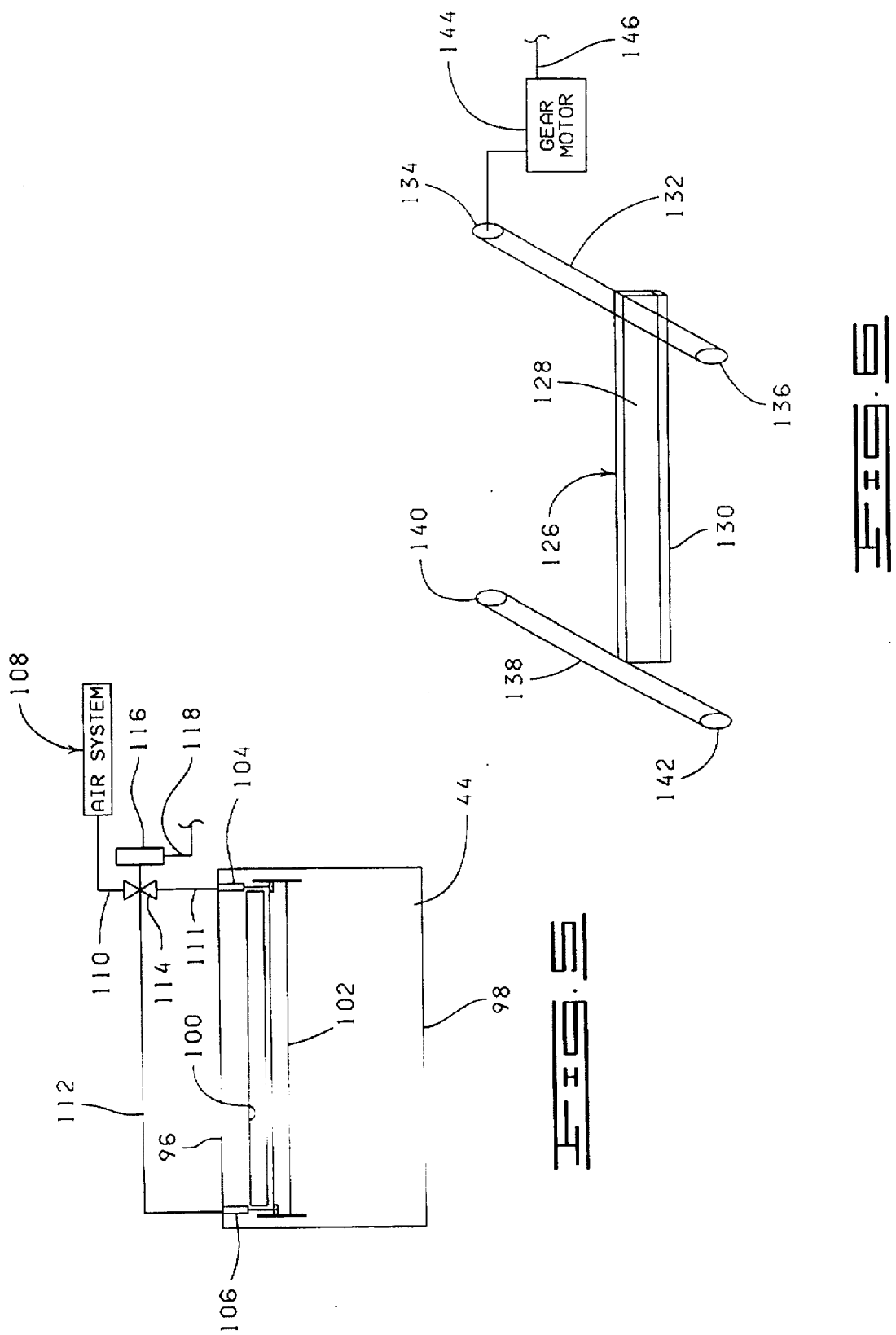

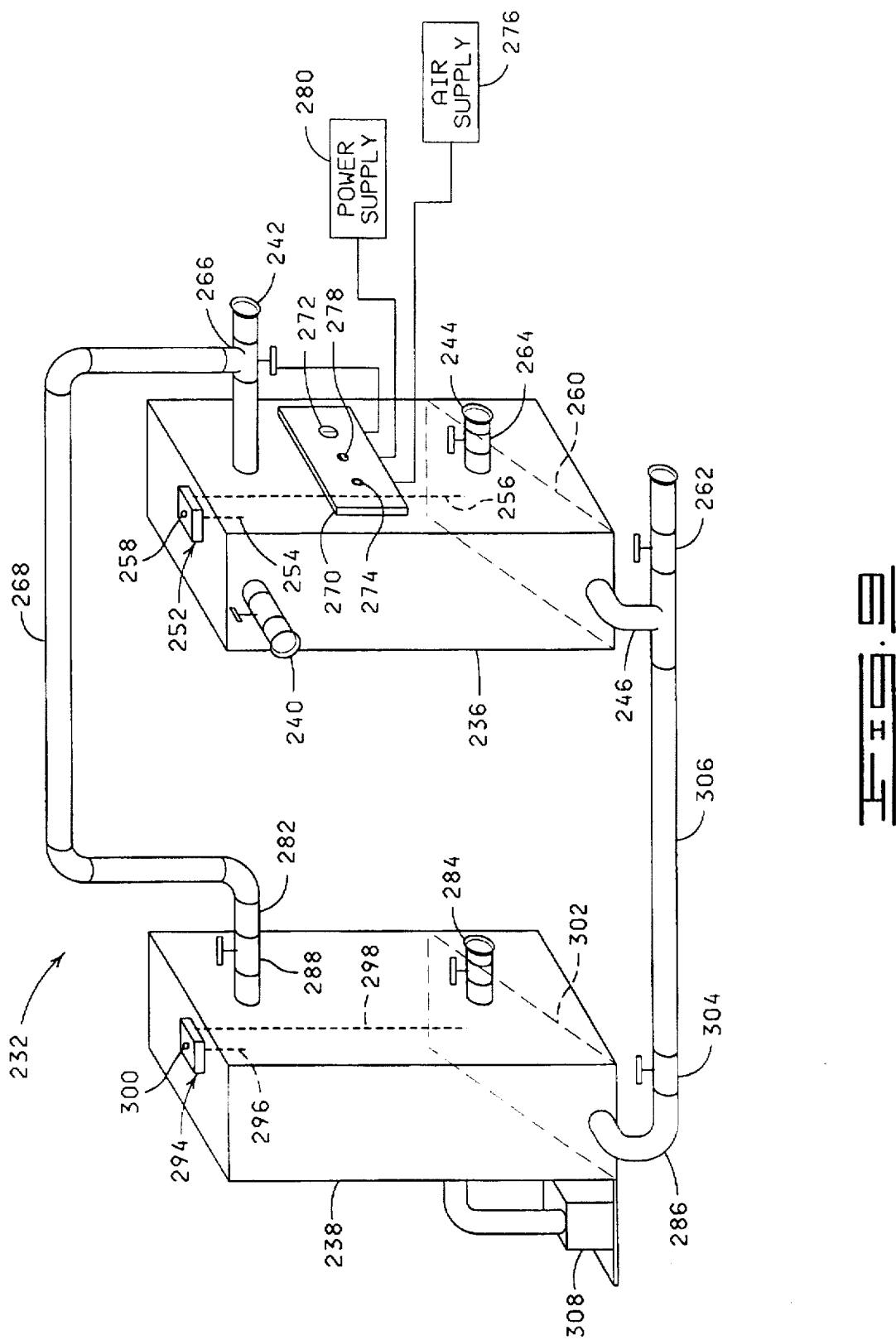

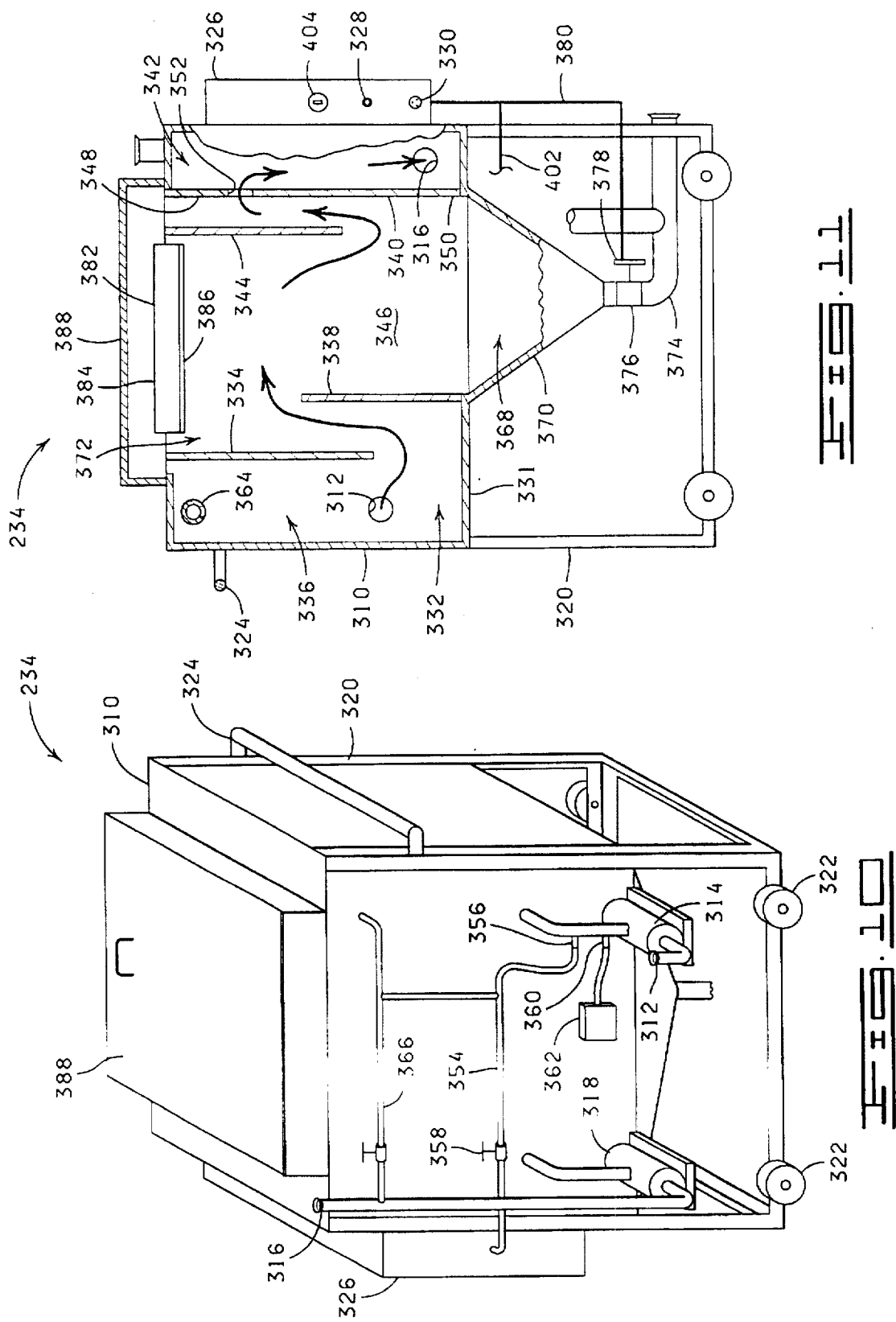

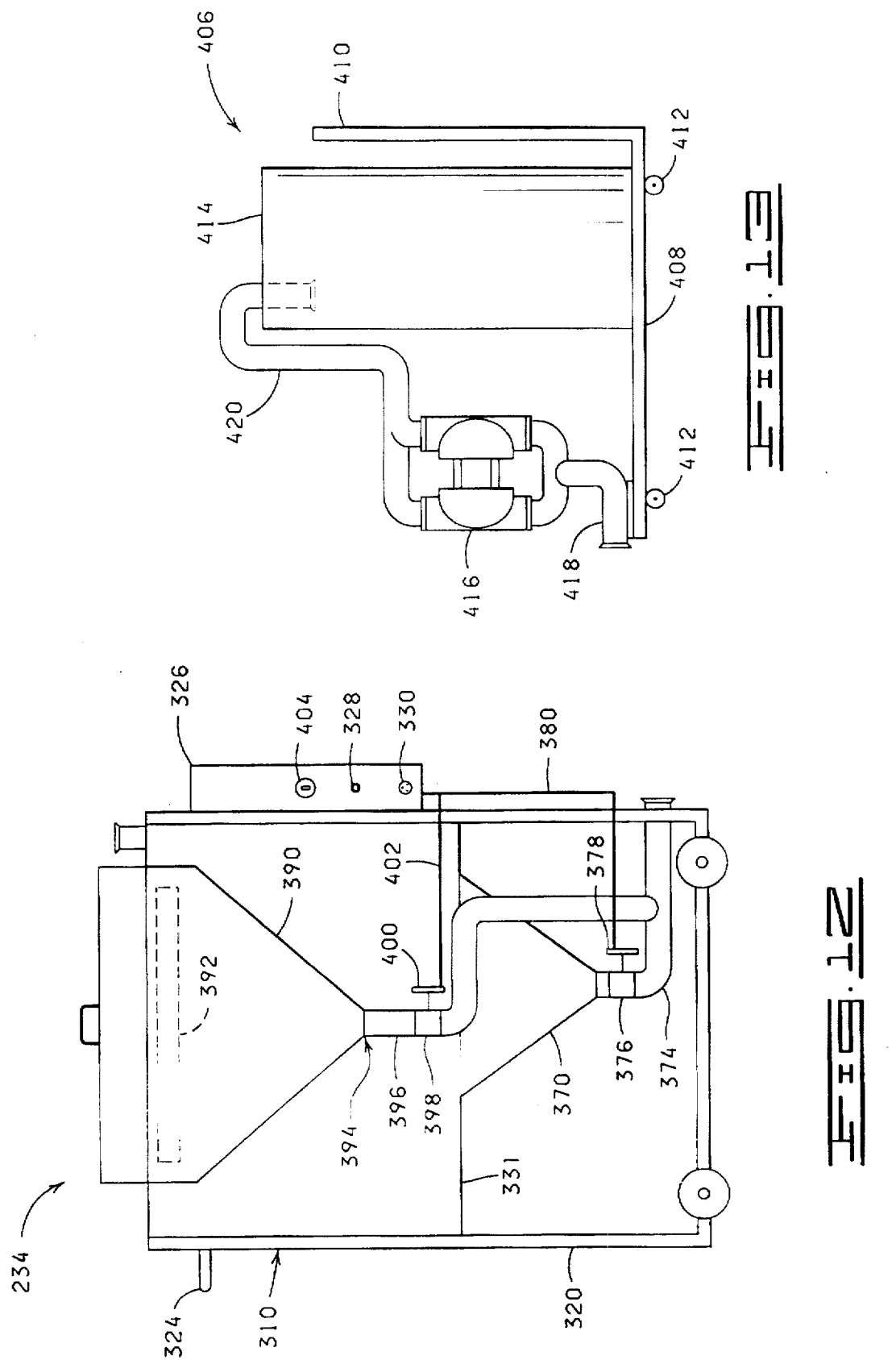

PORTABLE WASTEWATER TREATMENT METHOD

RELATED REFERENCES

This application is a continuation of U.S. application Ser. No. 08/300,686 entitled "PORTABLE WASTEWATER TREATMENT METHOD" filed Sep. 2, 1994, now U.S. Pat. No. 5,534,159, which is a continuation-in-part of U.S. application Ser. No. 08/100,876 entitled "WATER TREATMENT METHODS AND APPARATUS" filed Aug. 1, 1993; which is a continuation of U.S. application Ser. No. 07/969,615 entitled "WASTEWATER TREATMENT APPARATUS AND METHOD" filed Oct. 30, 1992, now U.S. Pat. No. 5,288,787, issued Feb. 22, 1994; which is a continuation of U.S. application Ser. No. 07/616,583 filed Nov. 21, 1990, now U.S. Pat. No. 5,173,184, issued Dec. 22, 1992.

FIELD OF THE INVENTION

The present invention relates generally to wastewater treatment systems, and more particularly, but not by way of limitation, to a portable wastewater treatment system for recycling an aqueous surfactant solution used for cleaning parts in a parts washer assembly wherein the aqueous surfactant solution is contaminated with residue removed from parts during the cleaning of same by the aqueous surfactant solution.

BRIEF DESCRIPTION OF THE DRAWINGS

FIG. 5 is an elevational view of a portion of the treatment cell shown in FIG. 3.

FIG. 6 is a partial perspective, partial diagrammatic view of a rake for removing light sludge from the treatment cell shown in FIG. 3.

FIG. 7A is a schematic view of the conveyor belt in the drying zone showing a spray bar for removing sludge from the openings in the conveyor belt.

FIG. 10 is a perspective rear view of a portable wastewater treatment apparatus constructed in accordance with the present invention.

FIG. 11 is a partially cutaway, elevational view of the portable wastewater treatment apparatus.

FIG. 12 is an elevational view of the portable wastewater treatment apparatus.

FIG. 13 is an elevational view of a portable cart having a pump and disposal container disposed thereon.

DESCRIPTION OF THE PREFERRED EMBODIMENTS

Figure 1:
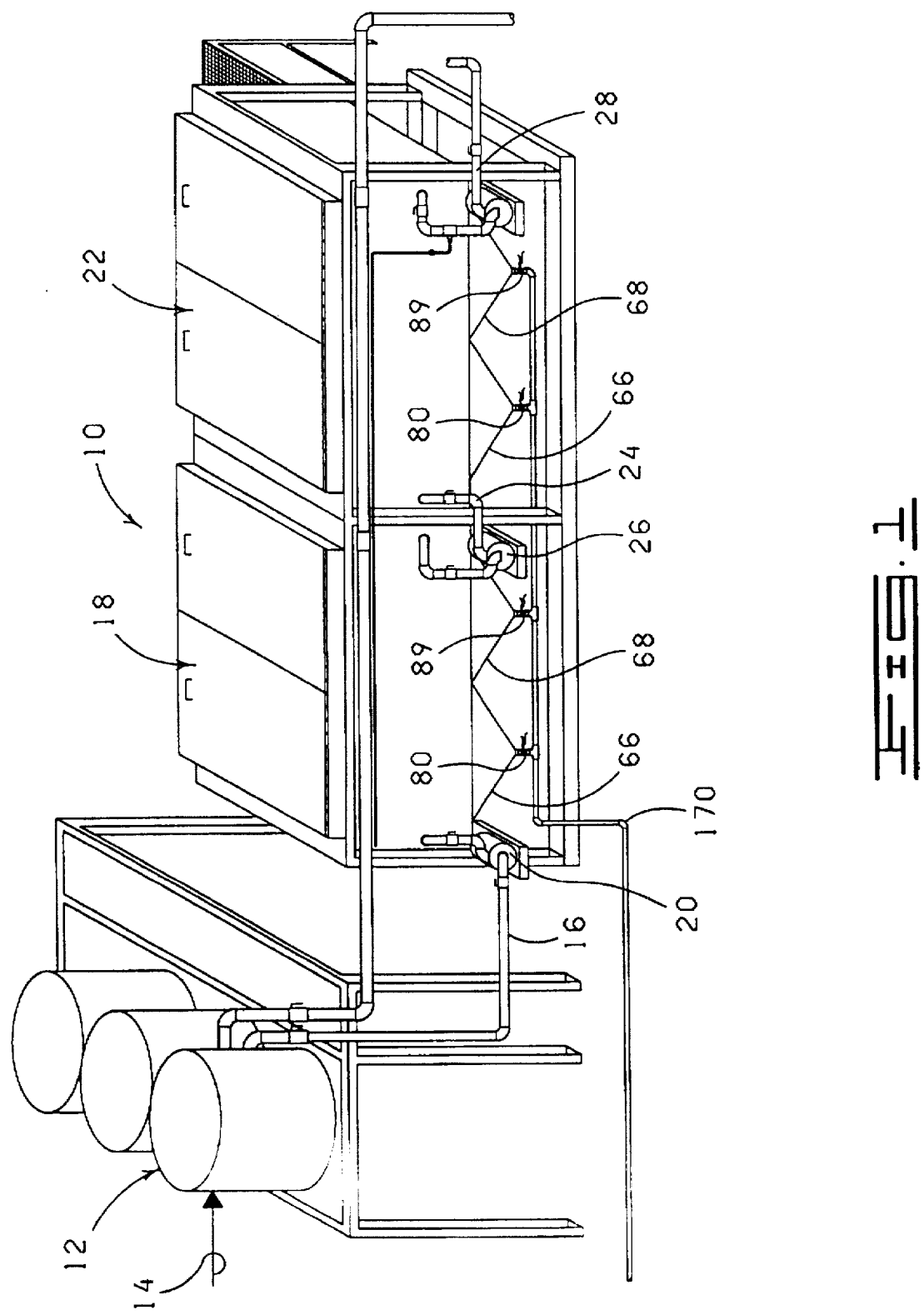
FIG. 1 is a partial perspective, partial schematic rear view of a wastewater treatment apparatus constructed in accordance with the present invention.
Figure 2:
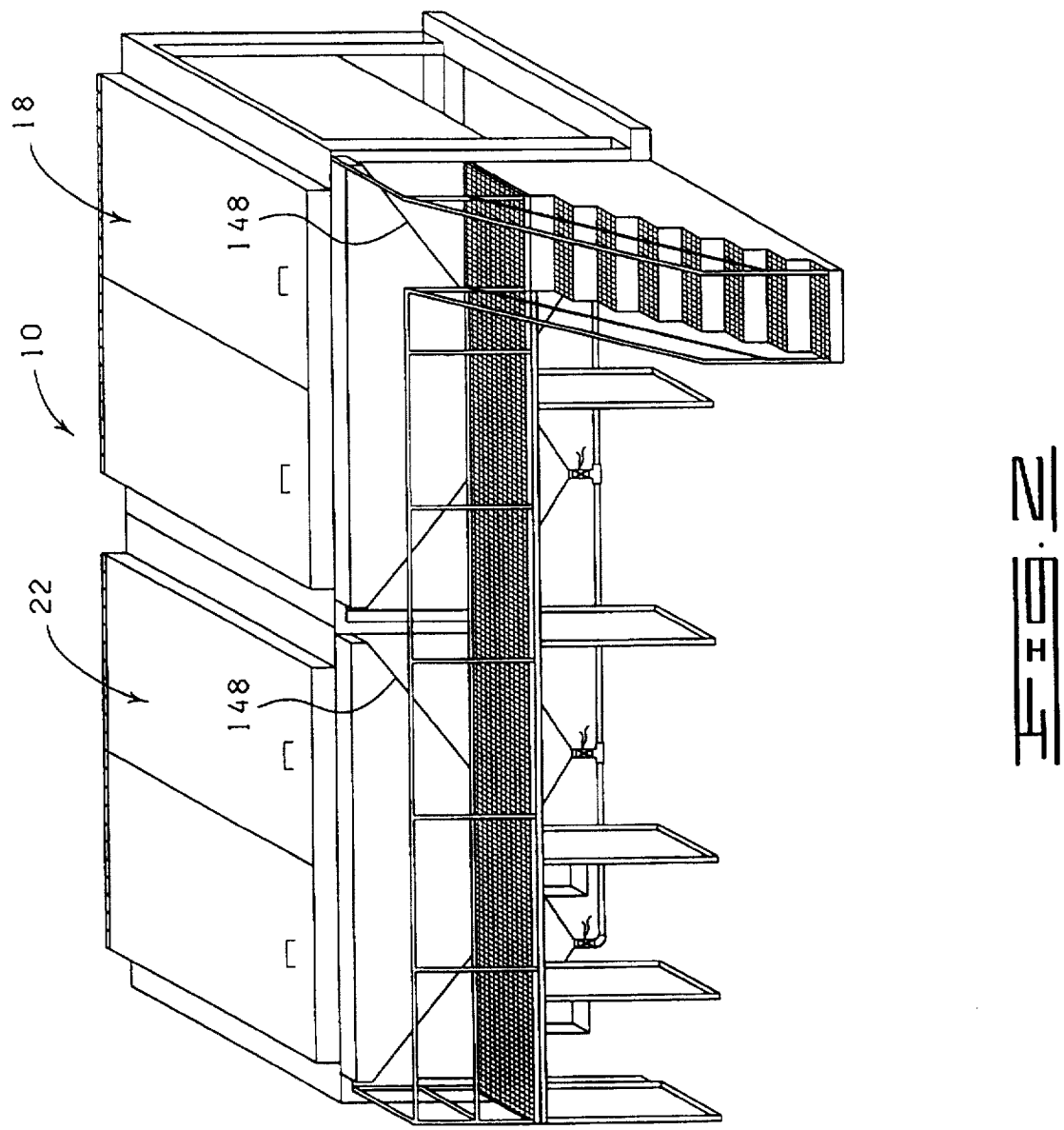
FIG. 2 is a partial perspective, partial schematic front view of a portion of the wastewater treatment apparatus of FIG. 1, particularly showing the two treatment cells.

Shown in FIGS. 1 and 2 and designated by the general reference numeral 10 as a wastewater treatment apparatus constructed in accordance with the present invention. In general, wastewater is passed into tanks 12 (FIG. 1) by way of a conduit 14 (FIG. 1). The wastewater is passed from the tanks 12 through a conduit 16 (FIGS. 1 and 3) into a first treatment cell 18 (FIGS. 1, 2, 3 and 4). A pump 20 (FIG. 1) is interposed in the conduit 16 for pumping the wastewater into the first treatment cell 18.

Figure 3:
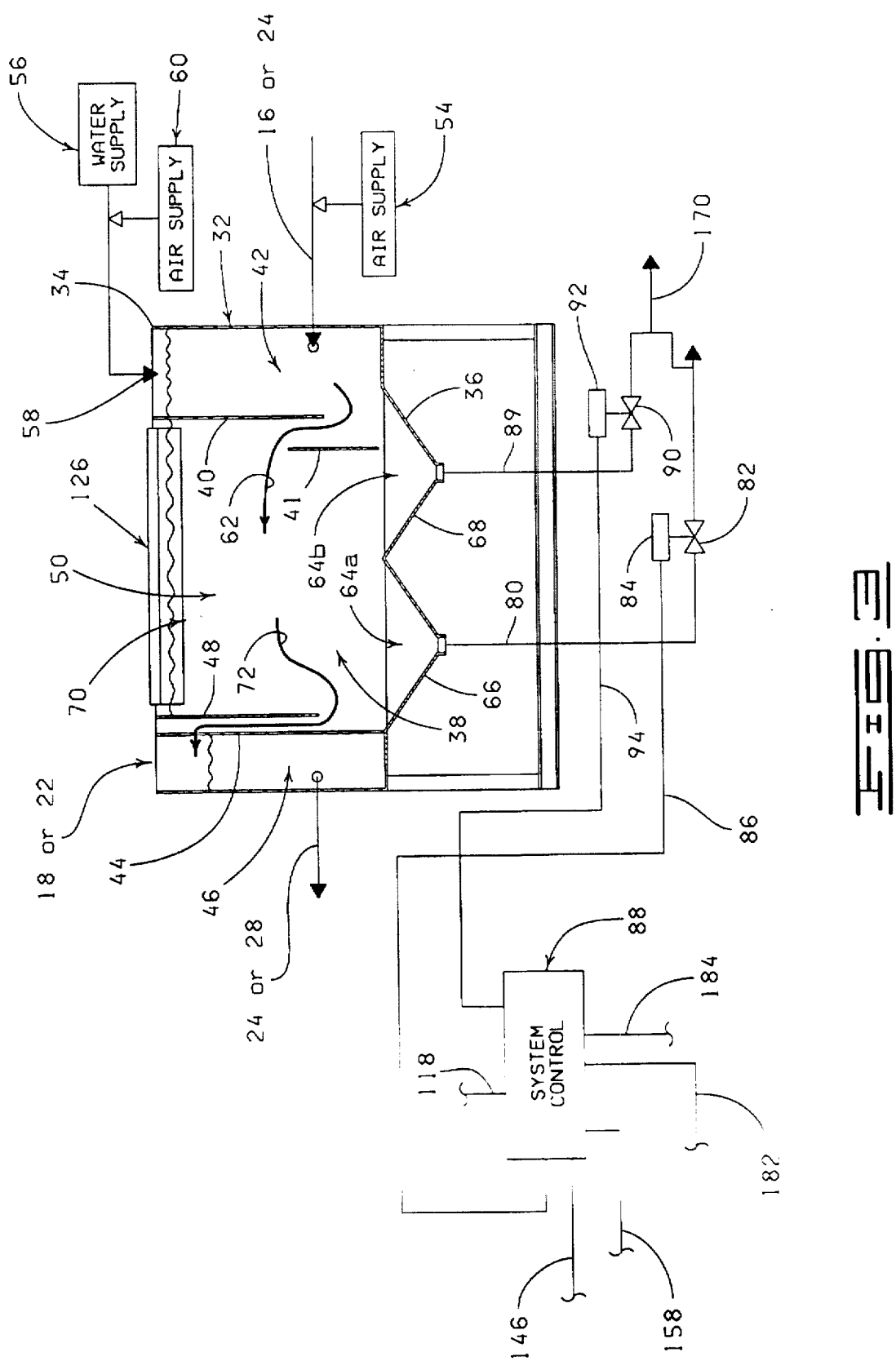
FIG. 3 is a sectional view of a typical treatment cell in the wastewater treatment apparatus shown in FIGS. 1 and 2 and schematically showing the controls for discharging sludge from the wastewater treatment apparatus.

The wastewater is treated in the first treatment cell 18. The treated wastewater is discharged or passed from the first treatment cell 18 and passed into a second treatment cell 22 (FIGS. 1, 2, 3 and 4) by way of a conduit 24 (FIGS. 1 and 3). A pump 26 (FIG. 1) being interposed in the conduit 24 for pumping the treated wastewater from the first treatment cell 18 into the second treatment cell 22.

The wastewater is treated again in the second treatment cell 22 and the treated wastewater is passed or discharged from the second treatment cell 22 by way of a conduit 28 (FIGS. 1 and 3). A pump 30 (FIG. 1) is interposed in the conduit 28 for pumping the treated wastewater from the second treatment cell 22.

Figure 4:
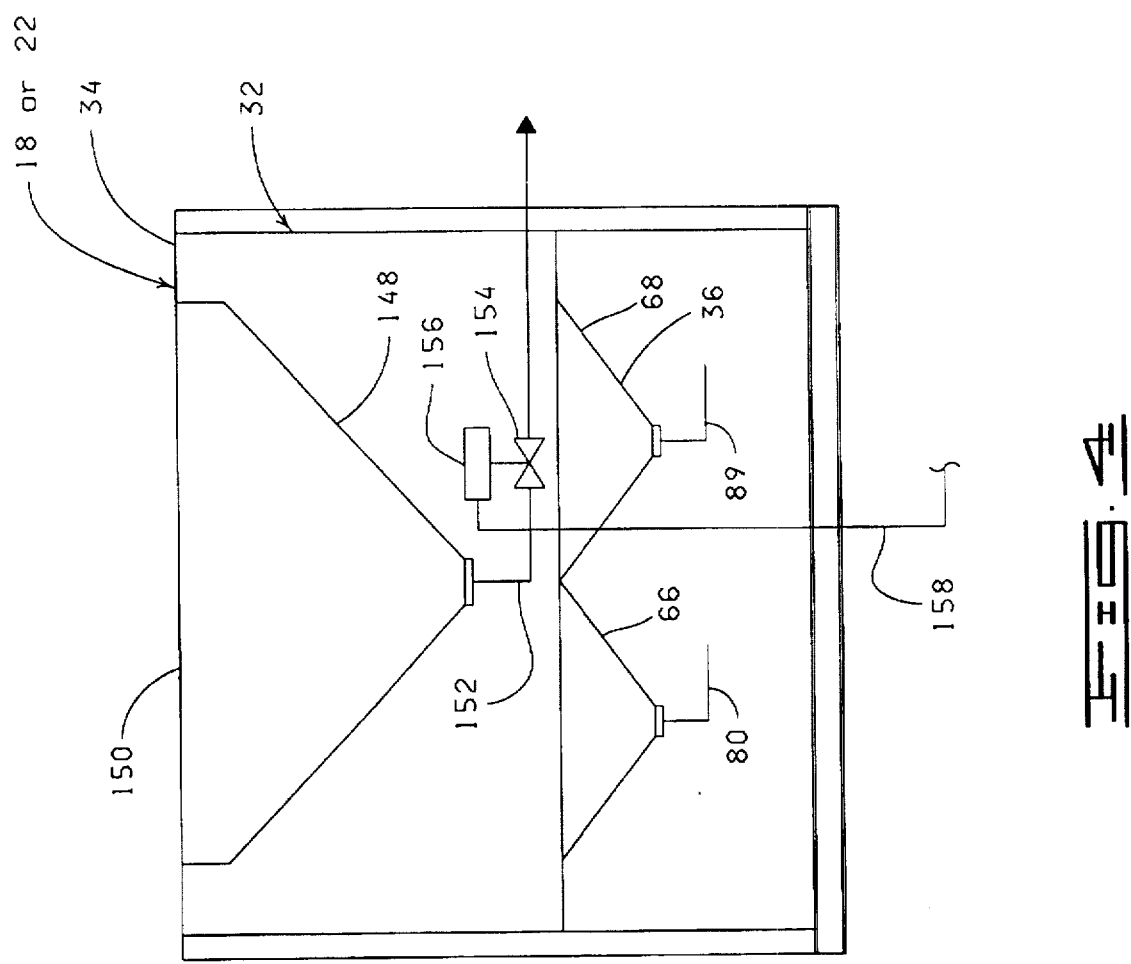
FIG. 4 is an elevational view of the front side of the typical treatment cell shown in FIG. 3.

The first and the second treatment cells 18 and 20 are identical in construction and operation. A typical treatment cell 18 or 20 is shown in greater detail in FIG. 3. The treatment cell 18 or 20 includes a housing 32 (FIGS. 3 and 4) having a top 34 (FIGS. 3 and 4) and a bottom 36 (FIGS. 3 and 4). The housing 32 encompasses and defines an internal chamber 38 (FIG. 3).

A baffle 40 (FIG. 3) is connected to the housing 32 and supported within the internal chamber 38. The baffle 40 cooperates with a portion of the housing 32 to define a mixing zone 42. A baffle 41 is disposed in the internal chamber 38 near the baffle 40 for defining a path for the wastewater to be passed from the mixing zone 42.

A baffle 44 (FIGS. 3 and 5) is disposed in the internal chamber 38 near one end of the housing 32, opposite the end of the housing forming the mixing zone 42. The baffle 44 cooperates with a portion of the housing 32 to define a discharge zone 46 in the internal chamber 38. A baffle 48 (FIG. 3) is disposed in the internal chamber 38 and positioned near the baffle 44 for defining a path through which the treated wastewater passes into the discharge zone 46. The area in the internal chamber 38 between the baffle 48 and the baffle 40 or, in other words, between the mixing zone 42 and the discharge zone 46 defines a quiescent zone 50 (FIG. 3).

The wastewater passes into the mixing zone 42 via either the conduit 16 or the conduit 24 depending on whether the treatment cell is the first treatment cell 18 or the second treatment cell 22. Prior to passing the wastewater into the first treatment cell 18 and prior to passing the wastewater into the second treatment cell 22, compressed air from an air supply 54 (FIG. 3) is introduced into the wastewater. The compressed air is introduced into the wastewater in an amount sufficient so that large air bubbles are formed in the wastewater in the mixing zone of the treatment cell 18 or 22.

A water supply 56 (FIG. 3) is connected to spray nozzles 58 (FIG. 3) positioned above the liquid level in the mixing zone. Air from an air supply 60 (FIG. 3) is introduced into the water prior to the water being sprayed into the mixing zone via the nozzles 58.

The wastewater in the mixing zone is sprayed with water from the nozzles 58. The nozzles 58 are positioned above the liquid level of the wastewater in the mixing zone 42. The water sprayed onto the surface of the wastewater in the mixing zone 42 so that the sprayed water contacts the large air bubbles in the mixing zone 42 and substantially reduces the size of the large air bubbles in the mixing zone.

The wastewater is passed from the mixing zone 42 into the quiescent zone 50 as indicated by the arrow 62 in FIG. 3. In the quiescent zone 50, heavy sludge is permitted to settle to the bottom of the housing 32 into a heavy sludge area 64 (FIG. 3) formed in the internal chamber 38 near the bottom 36 of the housing 32. More particularly, the bottom 36 of the housing 32 comprises two cone shaped members 66 and 68 (Figures. 1, 3 and 4). The cone shaped members 66 and 68 surround and define the heavy sludge area 64 with the cone shaped members 66 defining a heavy sludge area 64a (FIG. 3) and the cone shaped members 68 defining a heavy sludge area 64b (FIG. 3).

In the quiescent zone 50, light sludge is permitted to rise to the upper liquid level of the wastewater in the quiescent zone 50 forming and defining a light sludge area 70 (FIG. 3) positioned near the top of the liquid level in the quiescent zone 50. The treated liquid portion of the wastewater in the quiescent zone 50 is disposed between the heavy sludge area 64 and the light sludge area 70 and this treated wastewater is passed from the quiescent zone 50 upwardly between the baffles 44 and 48 and discharged through an opening in the baffle 44 into the discharge zone 46 as indicated by the arrow 72 in FIG. 3. The treated wastewater is passed from the discharge zone 46 through either the conduit 24 into the second treatment cell 22 or through the conduit 28 out from the second treatment cell 22 depending upon whether the treatment cell shown in FIG. 3 is the first treatment cell 18 or the second treatment cell 20.

It should be noted that, although only two treatment cells 18 and 22 are shown in FIGS. 1 and 2, the wastewater treatment apparatus 10 of the present invention could include additional treatment cells all constructed like with the treatment cell shown in FIG. 3 connected in series with the first and the second treatment cells 18 and 20 shown in FIGS. 1 through 3 and described before. It also should be noted that the wastewater treatment apparatus 10 may include only the first treatment cell 18 and, in this event, the treated wastewater is discharged from the first treatment cell 18 and passed to an area for removal or to a drying zone as will be described below.

The wastewater treatment apparatus 10 as described before is shown and described in detail in Applicant's co-pending application, U.S. Ser. No. 07/969,615, titled WASTEWATER TREATMENT APPARATUS AND METHOD, filed, Oct. 30, 1992; which is a continuation of Applicant's U.S. Pat. No. 5,173,184, titled WASTEWATER TREATMENT APPARATUS AND METHOD, issued Dec. 22, 1992, and the disclosures in this co-pending application and this issued patent hereby specifically are incorporated herein by reference.

It should be noted that in lieu of the two cone shaped members 66 and 68, a single cone shaped member could form the bottom 36 of the housing 30 thereby providing only one discharge area for the heavy sludge or two or three discharge areas could be provided in the single cone shaped member.

A discharge conduit 80 (FIGS. 1, 3 and 4) is connected to the cone shaped member 66 and the opening through the discharge conduit 80 is in fluidic communication with the heavy sludge area 64a. The heavy sludge in the heavy sludge area 64a is passed through the opening in the discharge conduit 80 and discharged from the heavy sludge area 64a during one aspect of the operation as will be described below.

A valve 82 (FIG. 3) is interposed in the conduit 80. The valve 82 has an opened position and a closed position. In the opened position, the valve 82 establishes fluidic communication through the conduit 80 for discharging the heavy sludge from the heavy sludge area 64a through the conduit 80 for transferring the heavy sludge to a disposal area or a drying zone as will be described below. The valve 82 is a solenoid or electrically operated type of valve and includes a valve controller 84 (FIG. 3) adapted to receive an electrical signal by way of a signal path 86 (FIG. 3) from a system control 88 (FIG. 3). The system control 88 is constructed and adapted to provide a signal via the signal path 86 to cause the valve 82 to be opened for predetermined discharge times and at predetermined discharge intervals for controlling the discharge of the heavy sludge from the heavy sludge area 64a.

A discharge conduit 89 (FIGS. 1, 3 and 4) is connected to the cone shaped member 68 and the opening through the discharge conduit 89 is in fluidic communication with the heavy sludge area 64b. The heavy sludge in the heavy sludge area 64b is passed through the opening in the discharge conduit 89 and discharged from the heavy sludge area 64b during one aspect of the operation as will be described below.

A valve 90 (FIG. 3) is interposed in the conduit 89. The valve 90 has an opened position and a closed position. In the opened position, the valve 90 establishes fluidic communication through the conduit 89 for discharging the heavy sludge from the heavy sludge area 64b through the conduit 89 for transferring the heavy sludge to a disposal area or a drying zone as will be described below. The valve 90 is a solenoid or electrically operated type of valve and includes a valve controller 92 (FIG. 3) adapted to receive an electrical signal by way of a signal path 94 (FIG. 3) from the system control 88. The system control 88 is constructed and adapted to provide a signal via the signal path 94 to cause the valve 90 to be opened for predetermined discharge times at a predetermined discharge intervals for controlling the discharge of the heavy sludge from the heavy sludge area 64b.

The baffle 44 in the treatment cell 18 or 22 is shown in greater detail in FIG. 5. The baffle 44 has an upper end 96 and a lower end 98. The lower end 98 is secured to the bottom of the housing 32 and the upper end 96 is positioned above the liquid level of the wastewater in the internal chamber 38 of the housing 32. An opening 100 is formed through the baffle 44 and positioned near the upper end 96. The treated wastewater passes through the opening 100 into the discharge zone 46.

As shown in FIG. 5, a cover plate 102 is supported below the opening 100 and positioned about adjacent the baffle 44. The cover plate 102 is sized to cover and substantially close the opening 100 during certain aspects of the operation as will be described in greater detail below.

As shown in FIG. 5, the cover plate 102 is supported by two pneumatic cylinders 104 and 106. In practice, the pneumatic cylinders 104 and 106 each are connected to an air supply 108 via a conduit 110, a four way control valve 114 and a conduit 111 or 112, respectively. The pneumatic cylinders 104 and 106 utilize two air lines, one for passing air into the pneumatic cylinder 104 and 106 and each also includes a conduit for passing air from the pneumatic cylinders 104 and 106.

As shown in FIG. 5, the control valve 114 having a valve controller 116 is interposed in the conduit 110 for interrupting the communication between the air supply 108 and the pneumatic cylinders 104 and 106 in a closed position of the valve 114 and for establishing communication between the air supply 108 and the pneumatic cylinders 104 and 106 in an opened position of the valve 114. The valve controller 116 operates to receive an electrical signal via a signal path 118 (FIGS. 3 and 5) and, in response to receiving a signal via the signal path 118, the valve controller 116 opens the valve 114 establishing communication between the air supply 108 and the pneumatic cylinders 104 and 106. The signal path 118 is connected to the system control 88.

Each of the treatment cells 18 and 22 also includes a rake 126 (shown in FIG. 3 and shown in more detail in FIG. 6). The rake 126 comprises an elongated solid bar 128 (FIG. 6) having a rubber flap 130 (FIG. 6) attached to and extending a distance from the bottom of the bar 128.

A chain 132 (FIG. 6) is supported in the internal chamber 138 on two sprockets 134 and 136 (FIG. 6). Another chain 138 (FIG. 6) is supported in the internal chamber 38 on two sprockets 140 and 142. The chain 132 is spaced a distance from the chain 138 and the chains 132 and 138 extend generally along the opposite sides of the housing 32 and are disposed near the top 34 of the housing 32. The opposite ends of the bar 128 are connected to the respective chains 132 and 138. The chains 132 and 138 are positioned in the internal chamber 38 for supporting the bar 128 and the rubber flap 130 connected thereto near the liquid level of the wastewater in the quiescent zone 50 or, more particularly, to position a portion of the bar 126 and the rubber flap 130 in the light sludge area 70.

A DC gear motor 144 (FIG. 6) is connected to the sprocket 134 for drivinly rotating the sprocket 134 thereby drivingly moving the chain 132 connected thereto. The movement of the chain 132 causes the bar 128 and the rubber flap 130 connected thereto to be moved following the movement of the chain 132 which also causes the chain 138 to be rotated on the idler sprockets 140 and 142. The DC motor 144 is connected to the system control 88 via a signal path 146 (FIGS. 3 and 6).

In a non-operating position, the chains 132 and 138 are driven to position the bar 128 and the rubber flap 130 connected thereto near or adjacent one side of the treatment cell 18 or 22.

A light sludge bin 148 (FIGS. 2 and 4) is connected to one side of the housing 32 and an upper end 150 of the light sludge bin 148 is positioned near the open top 34 of the housing 32. The light sludge bin 148 has a cone shaped lower portion. A discharge conduit 152 (FIG. 4) is connected to a lower end of the light sludge bin 148 and positioned so that the opening in the conduit 152 is in fluidic communication with the interior space (not shown) in the light sludge bin 148.

A control solenoid type valve 154 (FIG. 6) is interposed in the discharge conduit 152. The control valve 154 has a valve controller 156 (FIG. 6) which is a adapted to receive an electrical signal via a signal path 158 (FIGS. 3 and 4) from the system control 88.

The control valve 154 has an opened position and a closed position. In response to receiving a signal from the system control 88, the valve controller 156 causes the control valve 154 to be opened thereby establishing fluidic communication through the discharge conduit 152 and permitting light sludge in the light sludge bin 148 to be discharged therefrom.

The wastewater treatment apparatus 10 is constructed so that the discharge from the heavy sludge areas 64a and 64b in each of the treatment cells 18 and 22 is controlled by the system control 88 and so that the discharge of the light sludge from the light sludge bin 148 also is controlled via the system control 88. In operation and in a particular system, one may find that heavy sludge will build up quicker in one or more of the heavy sludge areas 64a and 64b of the treatment cells 18 or 22 and the system control 88 is adapted so that the discharge of the heavy sludge from the heavy sludge areas 64a and 64b of each of the treatment cells 18 and 22 is individually controllable.

In operation, the various discharge times are preset in the system control 88. At the predetermined discharge times, the system control 88 outputs a signal on the signal paths 86 and 94 and in response to such signals, the valve controllers 84 and 94 operate to open the control valves 82 and 90 thereby causing heavy sludge to be discharged through the discharge conduits 80 and 89 of the treatment cells 18 and 22. As noted before, the discharge times for discharging the heavy sludge in the heavy sludge areas 64a and 64b of the treatment cells 18 and 22 all could be different. The signals outputted by the system control 88 cause the respective valve controllers 84 and 92 to maintain the control valves 82 and 90 in the opened position for predetermined discharge intervals of time. Again, the predetermined discharge intervals of time can be the same or different for discharging the heavy sludge from the heavy sludge areas 64a and 64b of the treatment cells 18 and 22.

The system control 88 also is preset to output a signal on the signal path 118 at a predetermined time and at predetermined time intervals thereby causing the valve controller 116 to open the respective control valve 114 thereby establishing communication between the air supply 108 and the respective pneumatic cylinders 104 and 106. The pneumatic cylinders 104 and 106 cause the cover plate 102 to be moved upwardly to a position wherein the cover plate 102 closes or partially closes the opening 100 in the baffle 44. The closing or partial closing of the opening 100 by the cover plate 102 causes the liquid level or, more particularly, the light sludge level in the light sludge area 70 in the quiescent zone 50 to rise toward the top 34 of the housing 32 to a position wherein the rake 126 is disposed in and below the upper level of the light sludge in the light sludge area 70.

Simultaneously with the output of the signal to the valve controller 116 along signal path 118, the system control 88 outputs a signal on the signal path 146 to the DC gear motor 144 energizing the DC gear motor 144 and causing the sprocket 134 to be drivingly rotated. In response to the driving rotation of the sprocket 134, the chain 132 is drivingly rotated thereby moving the rake 126 across the top of the quiescent zone 50. The rake engages the light sludge in the light sludge area 70 and moves the engaged light sludge causes the engaged light sludge to be passed into the opening in the light sludge bin 148.

In addition, the system controller 88 at predetermined discharge times outputs a signal on the signal path 158 thereby causing the valve controller 156 to open the control valve 154 for discharging light sludge from the light sludge bin through the discharge conduit 152. The system control 88 outputs the signal on the signal path 158 for causing the light sludge to be discharged from the light sludge bin 148 for predetermined discharge times and at predetermined discharge intervals.

Figure 7:
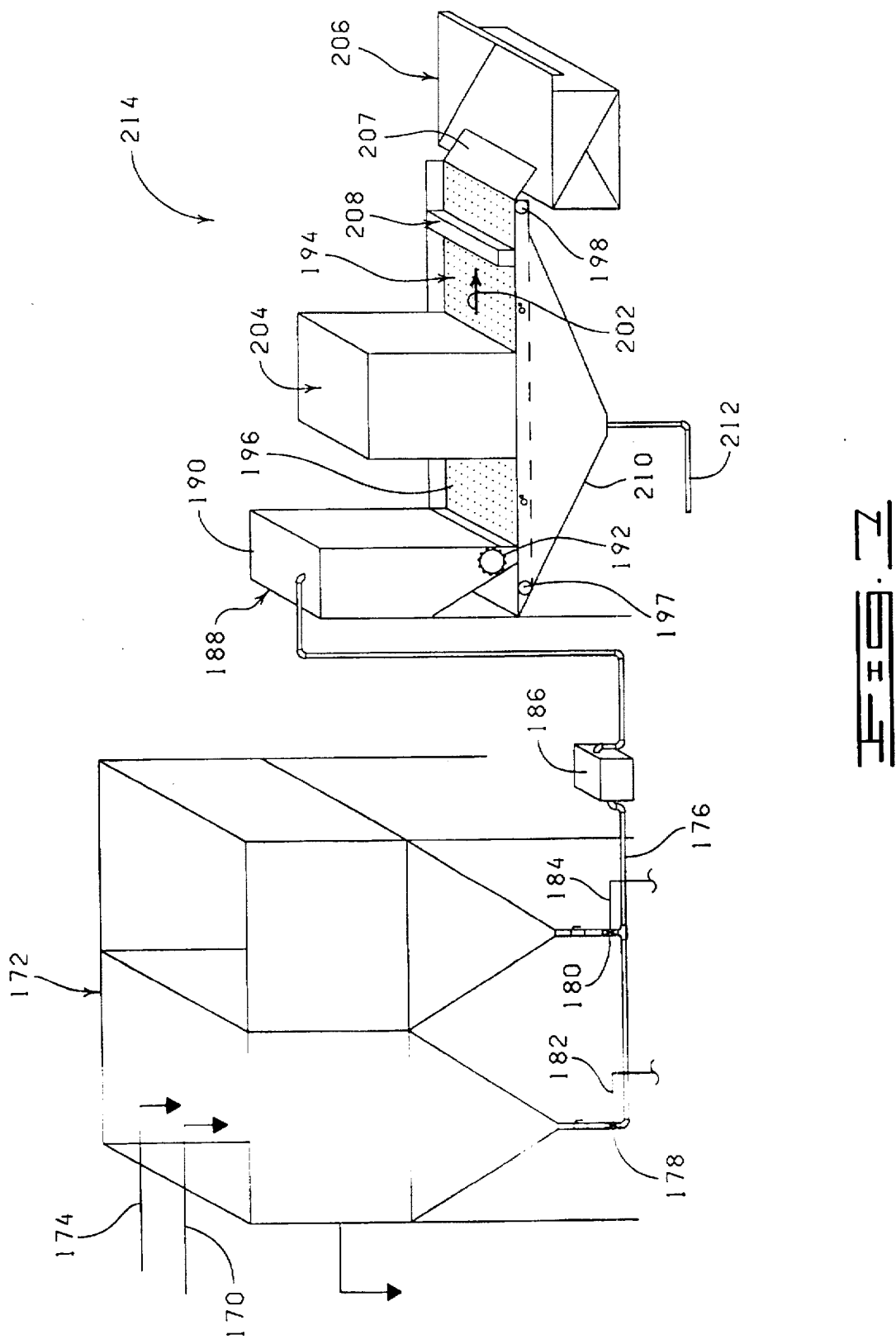
FIG. 7 is a perspective, diagrammatic view of the drying zone of the wastewater treatment apparatus showing where the sludge removed from the treatment cells in the wastewater treatment apparatus is dried.

The heavy sludge discharged from the heavy sludge areas 64a and 64b are passed through a common conduit 170 (FIGS. 1 and 3) and passed into storage tanks 172 (FIG. 7). The light sludge discharged from the light sludge bins 148 are passed through a common discharge conduit 174 (FIG. 7) and passed into the storage tanks 172.

In a preferred embodiment, the heavy sludge and the light sludge are discharged into a single conduit (combined conduits 170 and 174) and a pump (not shown) is interposed in said conduit for pumping the heavy sludge and the light sludge into the storage tanks 172. Said pump (not shown) is automatically started when the valves 82 and 90 are opened.

The bottoms of the storage tanks 172 each are connected to a common discharge conduit 176 (FIG. 7). Control valves 178 and 180 (FIG. 7) are interposed in the discharge conduit 176 with the control valves 178 and 180 each controlling the discharge from one of the storage tanks 172. The control valves 178 and 180 are solenoid by the valves and each includes a valve controller (not shown). The system control 88 is adapted to output signals on signal paths 182 and 184 (FIGS. 3 and 7) for controlling (opening and closing) the respective control valves 178 and 180.

A pump 186 (FIG. 7) is interposed in the discharge conduit 176 for pumping the sludge from the storage tanks 172 in the opened position of either one or both of the control valves 178 and 180. The sludge is pumped into a distributor 188.

The distributor 188 comprises a housing 190 (FIG. 7) with an auger 192 (FIG. 7) disposed at a lower end thereof. The lower end of the housing 190 and the auger 192 disposed therein each are disposed above a perforated conveyor belt 194 (FIGS. 7 and 7A). The auger 192 functions to distribute the sludge disposed in the distributor 188 over the top of the perforated conveyor belt 194.

The perforated conveyor belt 194 has a plurality of openings 196 (FIG. 7) formed therethrough and spaced over the perforated conveyor belt 194. The perforated conveyor belt 194 is a continuous type of belt movable supported on two drive shafts 197 and 198 (FIGS. 7 and 7A). The drive shaft 198 is connected to a motor 201 (FIG. 7A) for drivingly rotating the drive shaft 198 connected thereto and rotatingly moving the perforated conveyor belt 194 in a direction 202 (FIGS. 7 and 7A).

The sludge is distributed on the perforated conveyor belt 194 by the distributor 188 and the sludge is moved via the perforated conveyor belt 194 in the direction 202 to a position wherein the sludge is disposed under an oven 204 which dries the sludge passing therethrough. Preferably, the oven 204 is a microwave type of oven for emitting microwave energy into the sludge for driving the water from the sludge. The water in the sludge passes through the openings 196 of the perforated conveyor belt 194. The dried sludge is passed from the oven 204 and discharged into a dumpster 206 (FIG. 7) or other type of container.

Preferably, a scraper 207 (FIG. 7) is located at the end of the conveyor belt 194. The scraper 207 blade is disposed about adjacent the conveyor belt 194 for scraping the dried sludge from the conveyor belt 194.

A blower 208 (FIG. 7) may be disposed above the perforated conveyor belt 194 for cooling the sludge dried by the oven 204 prior to discharging the sludge from the perforated conveyor 194 if desired. Further, additional heaters may be incorporated before and/or after the oven 204 for further driving the water from the sludge.

The water driven from the sludge and passed through the openings 196 in the perforated conveyor belt 194 passes into a drip pan 210 (FIG. 7) disposed below the perforated conveyor belt 194. The water is discharged from the drip pan 210 via a discharge conduit 212.

The distributor 188, the perforated conveyor belt 194, the oven 204 and the blower 208 cooperate to comprise a drying zone 214. In many instances, land fills will not take liquid sludge and the drying zone 214 of the present invention is adapted to dry the sludge prior to the sludge being discharged into the dumpster 206 for transportation to a waste disposal site such as a land fill.

Diagrammatically shown in FIG. 7A is the perforated conveyor belt 194. A spray bar 216 is disposed in the perforated conveyor belt 194 generally between the upper and the lower portions of the perforated conveyor belt 194. The spray bar 216 sprays water onto the lower portion of the perforated conveyor belt 194 for forcing particles of sludge which may have become lodged in the openings 196 to be passed through or discharged from the openings 196 and passed into the drip pan 210.

The valves have been described herein as being electrically operated. It should be noted that pneumatically or manually operated valves also would be suitable. Also, it should be noted that the motors described herein could be AC or DC or air driven type of motors.

If the sludge has a heavy concentration of oil or if the sludge is watery, materials can be added in the bins 172 for the thickening the sludge. Such thickening materials are well known such as diatomaceous earth or rice seed hulls or other similar materials. If high concentration of metals in the sludge, lime also can be added in the bins 172. In these instances, a mixer may be added in the bins 172 for mixing such materials with the sludge.

Embodiment of FIGS. 8–13

The degreasing of parts has been a problem which has long existed in the field of parts cleaning and reclamation. Because of environmental and health considerations, aqueous based solutions have been proposed as a replacement for solvent based solutions in the degreasing of parts. However, problems exist in the use of aqueous based solutions for degreasing of parts, such as poor cleaning performance, disposal problems resulting from oil emulsions generated during the cleaning procedure, the short effective life of the cleaning solutions, bacterial growth in the cleaning solution and excessive foaming of the cleaning solution. Further, heavy metals contamination of the cleaning solution present problems in the disposal of the spent aqueous cleaning solution.

Figure 8:
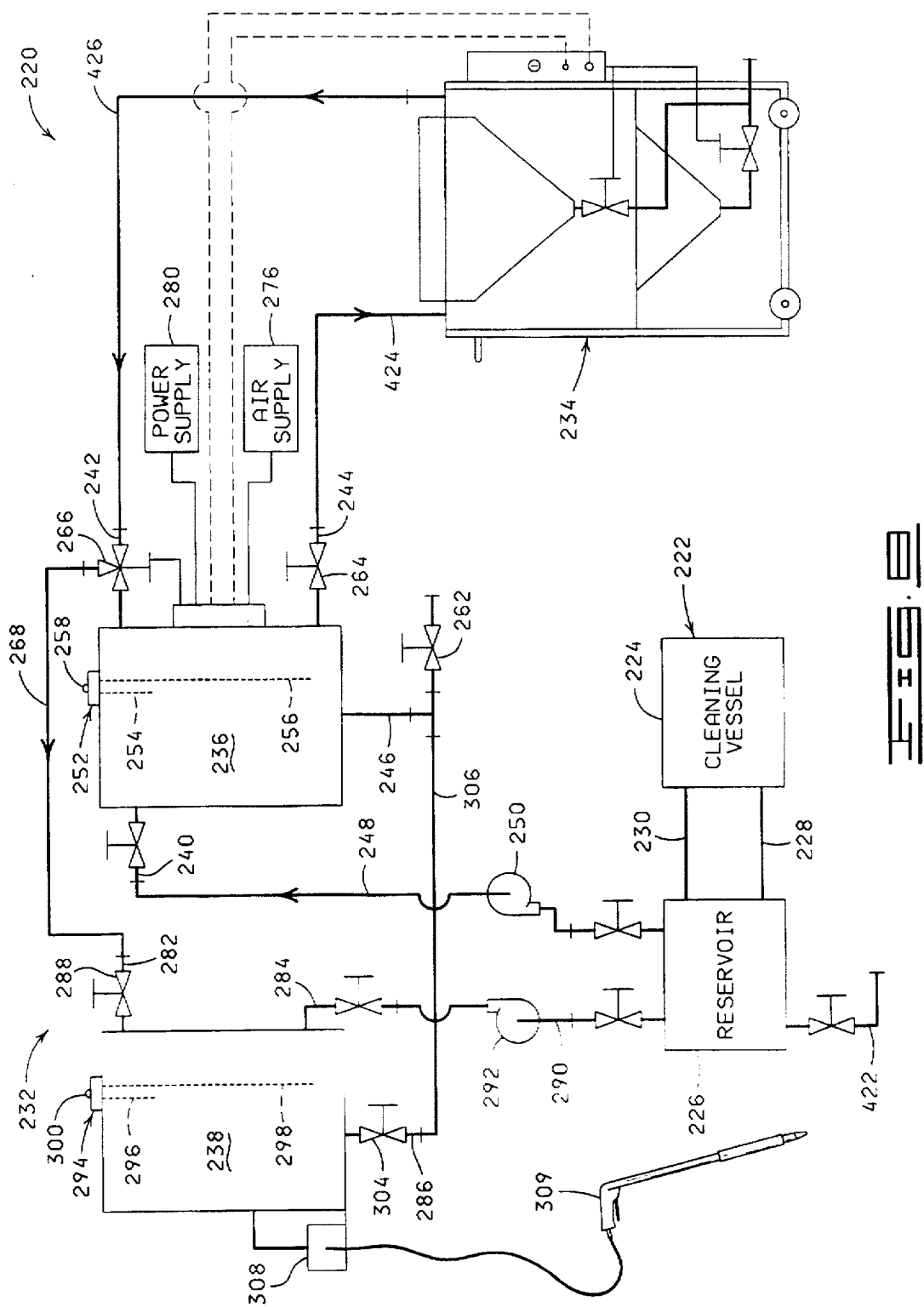
FIG. 8 is a schematic view of a portable wastewater treatment system constructed in accordance with the present invention illustrating the system operably connected to a parts washer assembly.

Shown in FIG. 8 is a schematic illustration of a waste water treatment assembly 220 constructed in accordance with the present invention which substantially eliminates the above referenced problems associated with aqueous based solutions for degreasing and washing parts by enabling the wastewater to be effectively treated and reused. The wastewater treatment assembly 220 is shown operably connected to a typical parts washer assembly 222 which includes a primary cleaning vessel 224 and a reservoir 226 containing an aqueous surfactant cleaning solution (referred to hereinafter as cleaning solution). The reservoir 226 is connected to the primary cleaning vessel 224 via a conduit 228 and a conduit 230. Conduit 228 serves as an inlet conduit for the cleaning vessel 224 and conduit 230 serves as an outlet conduit for the cleaning vessel 224 thereby enabling the cleaning solution to be continuously circulated through the cleaning vessel 224.

When the parts washer assembly 222 is in a parts cleaning cycle or mode, the cleaning solution is heated in the reservoir 226 by a heating device (not shown) which facilitates the dissolvement of the oil and grease coating the fouled parts. The heated cleaning solution is pumped via conduit 228 into the cleaning vessel 224 where it flows over the parts positioned therein. The cleaning solution circulates back to the reservoir 226 via conduit 230. The cleaning solution is circulated through the cleaning vessel 224 for a predetermined length of time after which the cleaned parts are removed from the cleaning vessel 224. The cleaning solution contained in the parts washer assembly 222 can usually be reused several times before the cleaning solution becomes contaminated to the point where it no longer cleans parts effectively and thus needs to be replaced.

When the cleaning solution is spent and thus no longer effective for cleaning parts, the cleaning solution is withdrawn from the reservoir 226 and passed to the wastewater treatment assembly 220. The wastewater treatment assembly 220 includes a cleaning solution storage tank assembly 232 and a portable wastewater treatment apparatus 234.

Figure 9:
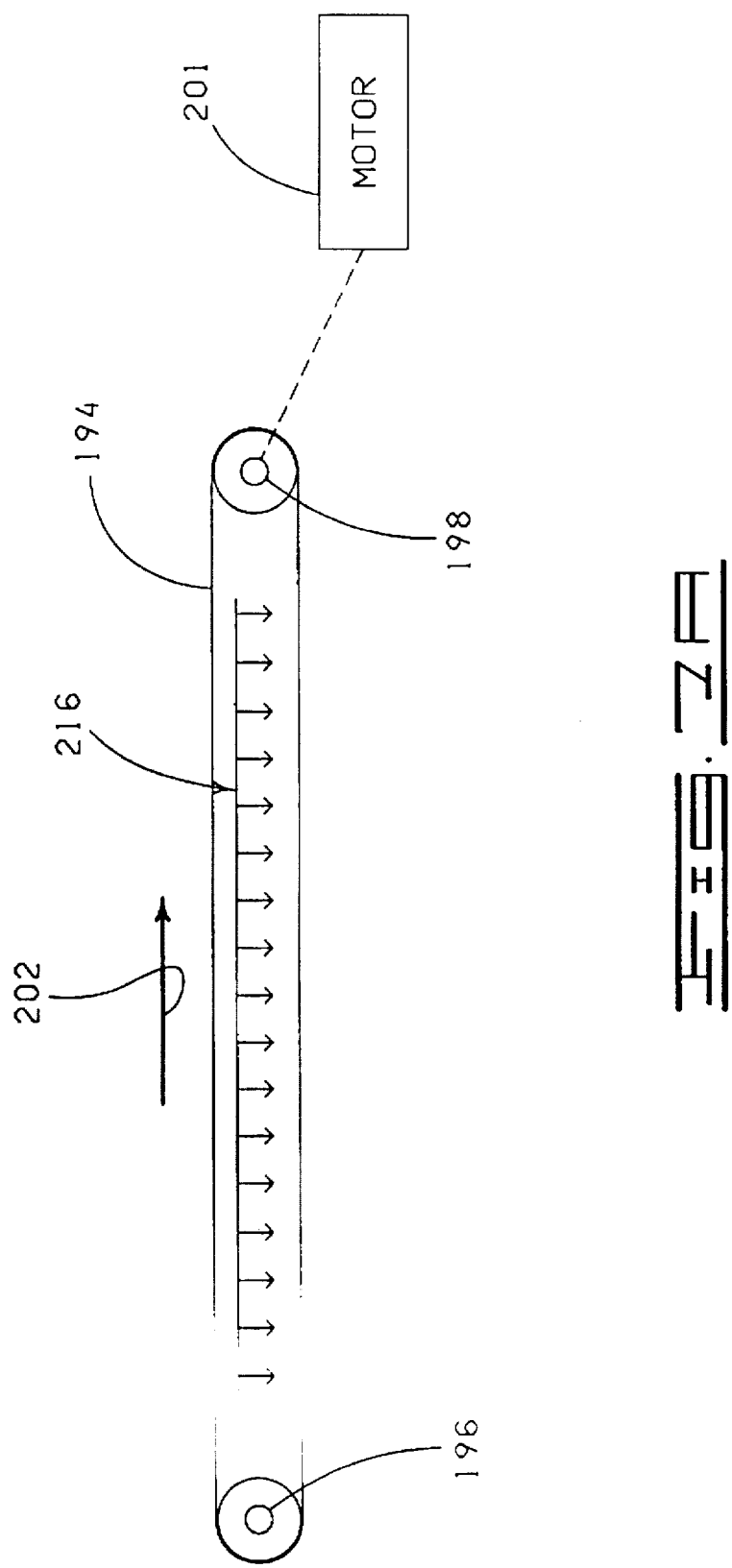
FIG. 9 is a partially schematic, partially perspective view of a solution storage tank assembly constructed in accordance with the present invention.

Referring to FIGS. 8 and 9, the cleaning solution storage tank assembly 232 includes a contaminated solution storage tank 236 and a treated solution storage tank 238 with each being provided so that when the cleaning solution which is being utilized in the parts washer assembly 222 at a particular time becomes contaminated to the point it needs to be replaced, the contaminated cleaning solution can be transferred to the contaminated solution storage tank 236 and replaced with pretreated or treated cleaning solution from the treated solution storage tank 238. This in turn enables the parts washer assembly 222 to be operated for an extended period of time without having to treat the contaminated cleaning solution, and thus allow plant personnel to treat the contaminated cleaning solution at their convenience without parts cleaning operations being disrupted.

The contaminated solution storage tank 236 for receiving and holding the contaminated cleaning solution is provided with a first fluid inlet 240, a second fluid inlet 242, a fluid outlet 244, and a solids outlet 246. The cleaning solution is transferred from the parts washer assembly 222 to the contaminated solution storage tank 236 via the first fluid inlet 240. The first fluid inlet 240 is connectable to the parts washer assembly 222 via a conduit 248 (FIG. 8) interconnecting the reservoir 226 and the first fluid inlet 240 of the contaminated solution storage tank 236. The conduit 248 in FIG. 8 is shown to have a pump 250 interposed therein for transferring the contaminated cleaning solution. Alternatively, a portable pump can be selectively coupled to the first fluid inlet 240 and the fluid outlet of the reservoir 226 to transfer the contaminated cleaning solution in a manner to be discussed in further detail hereinbelow.

In order that an operator can monitor the amount of cleaning solution in the contaminated solution storage tank 236, the contaminated solution storage tank 236 is provided with a liquid level sensing unit 252 which includes a short probe 254 and a long probe 256, each electrically connected to a light 258 mounted on the top of the contaminated solution storage tank 236. The long probe 256 extends into the contaminated solution storage tank 236 such that the long probe 256 extends a predetermined distance from the bottom of the contaminated solution storage tank 236. The short probe 254 extends into the contaminated solution storage tank 236 a predetermined distance such that the short probe 254 energizes the light 258 when the contaminated cleaning solution rises to the level of the short probe 254. The light 258 serves to inform an operator that the contaminated cleaning solution needs to be treated before the cleaning solution is changed in the parts washer assembly 222 again. The contaminated solution storage tank 236 has a sloped bottom plate 260 (shown in phantom in FIG. 9) to facilitate the removal of solids which settle out of the contaminated cleaning solution. The solids are periodically removed from the contaminated solution storage tank 236 via the solids outlet 246 which is provided with a valve 262.

The fluid outlet 244 is provided with a valve 264 and is selectively connectable to the portable wastewater apparatus 234. Similarly, the second fluid inlet 242 is selectively connectable to the wastewater treatment apparatus 234. However, the second fluid inlet 242 is provided with a three-way electric valve 266 which allows fluid to be selectively passed into the contaminated solution storage tank 236 or into the treated solution storage tank 238 via a conduit 268 which provides fluid communication with the treated solution storage tank 238.

The contaminated solution storage tank 236 is further provided with a control panel 270 on one side of the contaminated solution storage tank 236. The control panel 270 contains a switch 272 which is electrically connected to the three-way valve 266, an air hose connection 274 which is connected to an air supply 276, and an electric outlet 278 which is connected to a power supply 280. Further detail of the operation of the control panel will be described hereinbelow.

The treated solution storage tank 238 includes a fluid inlet 282, a fluid outlet 284, and a solids outlet 286. Treated cleaning solution is passed into the treated solution storage tank 238 via conduit 268 which interconnects the three-way valve 266 and the fluid inlet 282 of the treated solution storage tank 238. The fluid inlet 282 is provided with a valve 288.

As illustrated in FIG. 8, the fluid outlet 284 is connectable to the parts washer assembly 222 via a conduit 290 interconnecting the reservoir 226 and the fluid outlet 284 of the treated solution storage tank 238. The conduit 290 in FIG. 8 is shown to have a pump 292 interposed therein for transferring the treated cleaning solution to the reservoir 226. Alternatively, a portable pump can be selectively coupled to the fluid outlet 284 and the fluid inlet of the reservoir 226 to transfer the treated cleaning solution in a manner to be discussed in further detail hereinbelow.

In order that an operator can monitor the amount of cleaning solution in the treated solution storage tank 238, the treated solution storage tank 238 is provided with a liquid level sensing unit 294 which includes a short probe 296 and a long probe 298, each electrically connected to a light 300 mounted on the top of the treated solution storage tank 238. The long probe 298 extends into the treated solution storage tank 238 such that the long probe 298 extends a predetermined distance from the bottom of the treated solution storage tank 238. The short probe 296 extends into the treated solution storage tank 238 a predetermined distance such that the short probe 296 energizes the light 300 when the treated cleaning solution rises to the level of the short probe 296. The light 300 serves to inform an operator that the treated solution storage tank 238 is filled.

Like the contaminated solution storage tank 236, the treated solution storage tank 238 has a sloped bottom plate 302 (shown in phantom in FIG. 9) to facilitate the removal of solids which settle out of the contaminated cleaning solution. The solids are periodically removed from the treated solution storage tank 238 via the solids outlet 286. The solids outlet 286 is provided with a valve 304 and preferably the solids outlet 286 of the treated solution storage tank 238 is connected to the solids outlet 246 of the contaminated solution storage tank 236 with a conduit 306 such that solids can be removed from each tank simultaneously.

To enable a portion of the cleaning solution present in the treated solution storage tank 238 to be used to wash the side walls of the reservoir 226 after the contaminated cleaning solution has been transferred to the contaminated solution storage tank 236, a pressure washer 308 is operably connected to the treated solution storage tank 238 so that a portion of the cleaning solution in the treated solution storage tank 238 can be injected into the reservoir 226 at a sufficient pressure to flush or wash the reservoir 226. The cleaning solution is injected into the reservoir 226 from the pressure washer 308 via a spray wand 309.

After several parts washing operations and periodic changes of the cleaning solution in the reservoir 226, a volume of contaminated cleaning solution accumulates in the contaminated solution storage tank 236. When a predetermined volume of contaminated cleaning solution accumulates in the contaminated solution storage tank 236, the portable wastewater treatment apparatus 234 is positioned in close proximity to the contaminated and treated solution storage tanks 236, 238 so that the wastewater treatment apparatus 234 can be connected to the fluid outlet 244 and the second fluid inlet 242 of the contaminated solution storage tank 236. The wastewater treatment apparatus 234 treats the contaminated cleaning solution in a manner to remove the oils, particulate matter, and dissolved heavy metals from the cleaning solution and thereafter transfers the treated cleaning solution back to the treated solution storage tank 238 for reuse in the parts washer assembly 222.

Referring now to FIGS. 10–12, the portable wastewater treatment apparatus 234 is similar in construction to the treatment cell 18 or 20 described above. As best shown in FIG. 10, the portable wastewater treatment apparatus 234 includes a housing 310 having a fluid inlet 312 with a pump 314 and a fluid outlet 316 with a pump 318. To permit the wastewater treatment apparatus 234 to be freely moved from one parts washer assembly to another, the housing 310 is mounted to a support frame 320 which is supported on a plurality of wheels 322 (only two shown) to form, in essence, a wastewater treatment cart. A handle 324 is fixed to the housing 310 to facilitate movement of the wastewater treatment apparatus 234.

A cabinet 326 for containing a retractable air hose 328, a retractable electric cord 330, an assortment of switches is mounted on one side of the housing 310. The air hose 328 is adapted to be connected to the air hose connection 274 provided on the contaminated solution storage tank 236 so as to readily provide a source of compressed air to the wastewater treatment apparatus 234. Similarly, the electric cord 330 is adapted to be connected to the electric outlet 278 on the contaminated solution storage tank 236 to provide a source of power with which to operate the various components of the wastewater treatment apparatus 234.

As best illustrated in FIG. 11, the housing 310 has a bottom 331 and defines an internal chamber 332. A baffle 334 is connected to the housing 310 and supported within the internal chamber 332. The baffle 334 cooperates with a portion of the housing 310 to define a mixing zone 336. A baffle 338 is disposed in the internal chamber 332 near the baffle 334 for defining a path for the wastewater to be passed from the mixing zone 336.

A baffle 340 is disposed in the internal chamber 332 near one end of the housing 310, opposite the end of the housing 310 forming the mixing zone 336. The baffle 340 cooperates with a portion of the housing 310 to define a discharge zone 342 in the internal chamber 332. A baffle 344 is disposed in the internal chamber 332 and positioned near the baffle 340 for defining a path through which the treated wastewater passes into the discharge zone 342. The area in the internal chamber 332 between the baffle 344 and the baffle 334 or, in other words, between the mixing zone 336 and the discharge zone 342 defines a quiescent zone 346.

The baffle 340 has an upper end 348 and a lower end 350. The lower end 350 is secured to the bottom of the housing 310 and the upper end 348 is positioned above the liquid level of the wastewater in the internal chamber 332 of the housing 310. An opening 352 is formed through the baffle 340 and positioned near the upper end 348. The treated cleaning solution passes through the opening 352 into the discharge zone 342.

As described above in reference to FIG. 5, an adjustable cover plate (not shown) can be positioned adjacent the baffle 340 to selectively control the amount of treated cleaning solution passed from the quiescent zone 346 into the discharge zone 342. The cover plate is sized and positioned to cover and substantially close the opening 352.

The contaminated cleaning solution passes into the mixing zone 336 via the fluid inlet 312. Prior to passing the contaminated cleaning solution into the mixing zone 336 of the housing 310, a chemical treating agent and compressed air provided by the air supply 276 (FIG. 9) are introduced into the contaminated cleaning solution. The air hose 328 is retracted from the cabinet 326 and connected to the air hose connection 274 on the contaminated solution storage tank 236. As shown in FIG. 10, the air hose 328 interconnects the air supply 276 and an air injection line 354 which in turn is connected to the fluid inlet 312 via an air injection fitting 356. The air injection line 354 is provided with a control valve 358 to permit the injection of air to be selectively terminated during certain phases of the treatment process. The compressed air is introduced into the contaminated cleaning solution in an amount sufficient so that large air bubbles are formed in the contaminated cleaning solution in the mixing zone of the housing 310.

The chemical treating agent injected into the contaminated cleaning solution promotes the aggregation of smaller particles into larger particles so that contaminants are more readily settled to the bottom or floated to the surface with the assistance of air bubbles. The chemical treating agent is injected into the contaminated cleaning solution via an injection fitting 360 and a pump 362.

A spray nozzle 364 (FIG. 11) is provided above the liquid level in the mixing zone 336. The spray nozzle 364 is connected to a water supply line 366 which is connected to a water supply. Water can be supplied to the spray nozzle 364 in any suitable manner; however, the spray nozzle 364 is preferably interconnected to the fluid outlet 316, thereby allowing a portion of the treated cleaning solution to be passed to the spray nozzle 364 and sprayed into the contaminated cleaning solution in the mixing zone 336.

The spray water is preferably aerated by injecting a portion of the air passing through the air injection line 354 into the water supply line 366 prior to the water being sprayed into the mixing zone 336 via the nozzle 364.

The contaminated cleaning solution in the mixing zone 336 is sprayed with water from the nozzle 364. The nozzle 364 is positioned above the liquid level of the contaminated cleaning solution in the mixing zone 336. The water is sprayed onto the surface of the contaminated cleaning solution in the mixing zone 336 so that the sprayed water contacts the large air bubbles in the mixing zone 336 and substantially reduces the size of the large air bubbles in the mixing zone 336.

The contaminated cleaning solution (which now contains a large number of small bubbles) is passed from the mixing zone 336 into the quiescent zone 346 as indicated. In the quiescent zone 346 the contaminated cleaning solution separates into an upper layer containing light sludge or a sludge less dense than the cleaning solution, an intermediate layer constituting a treated cleaning solution, and a lower layer containing a heavy sludge or a sludge more dense than the cleaning solution.

The heavy sludge is permitted to settle to the bottom of the housing 310 into a heavy sludge area 368 (FIG. 11) formed in the internal chamber 332 near the bottom of the housing 32. More particularly, the bottom 331 of the housing 310 comprises a cone shaped member 370. The cone shaped member 370 surrounds and defines the heavy sludge area 368.

In the quiescent zone 346, light sludge rises to the upper liquid level of the contaminated cleaning solution forming and defining a light sludge area 372 positioned near the top of the liquid level in the quiescent zone 346. The treated cleaning solution formed in the quiescent zone 346 between the heavy sludge area 368 and the light sludge area 372 is passed from the quiescent zone 346 upwardly between the baffles 44 and 48 and discharged through the opening 352 in the baffle 340 into the discharge zone 342 as indicated. The treated cleaning solution is passed from the discharge zone 342 through the fluid outlet 316 by the pump 318.

A discharge conduit 374 (FIGS. 11 and 12) is connected to the cone shaped member 370 and the opening through the discharge conduit 374 is in fluid communication with the heavy sludge area 368. The heavy sludge in the heavy sludge area 368 is passed through the discharge conduit 374 and discharged from the heavy sludge area 368 during one aspect of the operation as will be described below.

A valve 376 is interposed in the conduit 374. The valve 376 has an opened position and a closed position. In the opened position, the valve 376 establishes fluid communication through the conduit 374 for discharging the heavy sludge from the heavy sludge area 368 through the conduit 374 for transferring the heavy sludge to a disposal container as will be described below. The valve 376 is a solenoid or electrically operated type of valve (normally closed) and includes a valve controller 378 adapted to receive an electrical signal by way of a signal path 380 in response to turning on a manual switch (not shown) located in the cabinet 326. The use of the manual switch allows the valve 376 to be opened for predetermined discharge times and at predetermined discharge intervals for selectively controlling the discharge of the heavy sludge from the heavy sludge area 368.

Similar to the treatment cell 18 and 20 described above, the wastewater treatment apparatus 234 includes a rake 382 (FIG. 11). The rake 382 includes an elongated solid bar 384 having a rubber flap 386 attached to and extending a distance from the bottom of the bar 384. The rake 382 operates in a similar manner as previously described with reference to the rake 126, except that the rake 382 used with the portable wastewater treatment apparatus 234 is operated via a manual switch (not shown) located in the cabinet 326 which allows an operator to selectively control the removal of the light sludge from the light sludge area 372. The housing 310 is provided with a removable lid 388 to enclose the rake 382 and its components.

As shown in FIG. 12, a light sludge bin 390 is connected to one side of the housing 310 and an upper end of the light sludge bin 390 is positioned near an opening 392 (shown in phantom in FIG. 12) in the housing 310 which provides communication between the quiescent zone 346 and the light sludge bin 390. The light sludge bin 390 has a cone shaped lower portion 394. A discharge conduit 396 (FIG. 12) is connected to a lower end of the light sludge bin 390 and positioned so that the conduit 396 is in fluid communication with the interior space (not shown) in the light sludge bin 390.

A control solenoid type valve 398 (normally closed) is interposed in the discharge conduit 396. The control valve 398 has a valve controller 400 which is a adapted to receive an electrical signal via a signal path 402 in response to turning on the switch (not shown) which is also electrically connected to the valve 376.

The control valve 398 has an opened position and a closed position. In response to receiving a an electrical signal in response to turning on the switch, the valve controller 400 causes the control valve 398 to open thereby establishing fluid communication through the discharge conduit 396 and permitting light sludge in the light sludge bin 390 to be discharged therefrom.

The portable wastewater treatment apparatus 234 shown herein is constructed so that the discharge of heavy sludge from the heavy sludge area 368 and light sludge from the light sludge bin 390 is controlled by a single manual switch. However, in operation one may find that heavy sludge will build up quicker in the heavy sludge area 368 than in the light sludge bin 390, and therefore, it may be desired to adapt the wastewater treatment apparatus 234 so that the discharge of the heavy sludge and the discharge of the light sludge are individually controllable.

The pumps 314, 318, the chemical treating agent pump 362 and the control valve 358 disposed in the air injection line 354 are electrically connected to a three-way switch 404 located on the cabinet 326. Employment of the three-way switch 404 allows an operator to simultaneously activate the chemical injection pump 362, the pumps 314, 318 so as to circulate cleaning solution through the housing 310, and to open the control valve 358 so as to start the injection of air into the contaminated cleaning solution. Further, the three-way switch 404 permits an operator to selectively discontinue the injection of the air and the chemical treating agent while the pumps 314 and 318 continue to pass fluid through the housing 310. The significance of this will be explained in more detail below.

FIG. 13 illustrates a portable cart 406 having a base 408, a handle 410, and a plurality of wheels 412. The cart 406 is provided with a disposal container 414, such as a 55 gallon drum, and a pump 416 having an suction conduit 418 and a discharge conduit 420. In one mode of use, the pump 416 can be adapted to transfer contaminated cleaning solution from the reservoir 226 to the contaminated solution storage tank 236 and treated cleaning solution from the treated solution storage tank 238 to the reservoir 226 by connecting the conduit 418 to the appropriate inlet or outlet and connecting the conduit 420 to the appropriate inlet or outlet. Utilization of the pump 416 can reduce costs in that it reduces the number of pumps used, particularly if several parts washer assemblies are being employed at one location. In another mode of use, the pump 416 is used to transfer solids from the reservoir 226, the contaminated solution storage tank 236 and the treated solution storage tank 238, and the wastewater treatment apparatus 234 to the disposal container 414.

OPERATION

In operation, when the cleaning solution in the reservoir 226 is spent, the contaminated cleaning solution in the reservoir 226 is passed from the reservoir 226 to the contaminated solution storage tank 236. The contaminated cleaning solution can be transferred to the contaminated solution storage tank 236, as illustrated in FIG. 8, via the pump 250 interposed in the conduit 248, or by positioning and coupling the suction conduit 418 to the fluid outlet of the reservoir 226 and the discharge conduit 420 to the first fluid inlet 240 of the contaminated solution storage tank 236 such that the portable pump 416 is operably disposed between the reservoir 226 and the contaminated solution storage tank 236 so as to be able to transfer fluid from the reservoir 226 to the contaminated solution storage tank 236. After the contaminated cleaning solution has been transferred from the reservoir 226, any solid residues which have settled and remain in the bottom of the reservoir 226 are withdrawn and transferred to the disposal container 414 via the pump 416 by connecting the suction conduit 418 to a solids outlet 422 of the reservoir 226 and positioning the free end of the discharge conduit 420 in the disposal container 414.

After the solids have been removed from the reservoir 226, a predetermined volume of treated or pretreated cleaning solution contained in the treated solution storage tank 238 is injected into the reservoir 226 by activating the pressure washer 308. The pressurized cleaning solution flushes the sidewalls of the reservoir 226 of any residue that may remain thereon. The cleaning solution used to flush the reservoir 226 is then transferred to the contaminated fluid storage tank 236. It should be noted that the long probe 298 in the treated solution storage tank 238 can be electrically connected to the pressure washer 308 such that the pressure washer 308 is de-energized when the liquid level in the treated solution storage tank 238 drops below the long probe 298. Finally, the reservoir 226 is filled with a volume of cleaning solution from the treated solution storage tank 238.

At this point, the parts washer assembly 222 is again ready for use. The parts washer assembly 222 is run through several parts cleaning cycles and solution changing cycles as described above until a predetermined volume of contaminated cleaning solution is accumulated in the contaminated solution storage tank 236 and conversely the cleaning solution in the treated solution storage tank 238 has been depleted. The light 258 on the liquid level sensing unit 252 of the contaminated solution storage tank 236 will energize and thereby signal to an operator that the cleaning solution in the contaminated solution storage tank 236 is in need of treatment.

At that point, the portable wastewater treatment apparatus 234 is positioned near the cleaning solution storage tank assembly 232 and a flexible conduit 424 is connected between the fluid outlet 244 of the contaminated solution storage tank 236 and the fluid inlet 312 of the wastewater treatment apparatus 234 so as to provide fluid communication therebetween, and a flexible conduit 426 is connected between the fluid outlet 316 of wastewater treatment apparatus 234 and the second fluid inlet 242 of the contaminated solution storage tank 236. In further preparing for treating the contaminated cleaning solution, the air hose 328 is pulled from the cabinet 326 and connected to the air hose connection 274 on the contaminated solution storage tank 236 and the electric cord 330 is pulled from the cabinet 326 and connected to electric outlet 278 on the contaminated solution storage tank 236.

To begin treating the contaminated cleaning solution, the three-way switch 404 in the cabinet 326 of the wastewater treatment apparatus 234 is turned to simultaneously activate the pumps 314, 318, the injection of compressed air, and the injection of the chemical treating agent. The pump 314 pulls liquid from the contaminated solution storage tank 236 and passes it through the fluid inlet 312 where the compressed air and chemical treating agent are injected into the contaminated cleaning solution. The contaminated cleaning solution then passes into the mixing zone 336 where large air bubbles form in the cleaning solution and move toward the surface. Water is sprayed onto the cleaning solution in the mixing zone 336 so that the sprayed water contacts the large air bubbles in the mixing zone 336 and substantially reduces the size of the large air bubbles in the mixing zone 336.

The cleaning solution passes from the mixing zone 336 into the quiescent zone 346 where it separates into an upper layer containing light sludge, an intermediate layer constituting a treated cleaning solution and a lower layer containing a heavy sludge. The quiescent zone 346 is characterized by reduced turbulence so that suspended oils and solids float to the surface with the assistance of air bubbles and treatment chemicals to form a froth at the surface, while the denser solids which settle to the bottom remain at the bottom. A middle layer of once-treated cleaning solution containing a reduced amount of suspended oils and solids is produced. The reduced turbulence in the quiescent zone 346 promotes the growth of the froth which is periodically skimmed with the rake 382 into the light sludge bin 390.

The treated cleaning solution is passed from the quiescent zone 346 through the opening 352 to the discharge zone 342. The treated cleaning solution in the discharge zone 342 contains a reduced level of contaminants and, in some cases, will be suitable for reuse. However, in many instances the cleaning solution may need to be treated several times. In that instance, the three-way valve 266 disposed in the second fluid inlet 242 of the contaminated solution storage tank 236 is positioned such that the fluid outlet 316 of the wastewater treatment apparatus 234 is in fluid communication with the contaminated solution storage tank 236, thus allowing the cleaning solution discharged from the discharge zone 342 of the housing 310 to pass back into the contaminated solution storage tank 236 via pump 318 and thereafter be continuously recirculated through the wastewater treatment apparatus 234 for a predetermined amount of time.

When the cleaning solution is sufficiently free of oils, particular matter and dissolved heavy materials, the three-way switch 404 is turned to deactivate the injection of air and chemical treating agent, but maintain the operation of the pumps 314 and 318. The three-way valve 266 interposed in the second fluid inlet 242 of the contaminated solution storage tank 236 is then positioned with the switch 272 to provide fluid communication between the fluid outlet 316 of the wastewater treatment apparatus 234 and the treated solution storage tank 238 via the conduit 268, and thus allow the treated cleaning solution to be discharged into the treated solution storage tank 238.

When the fluid level in the contaminated solution storage tank 236 falls below the long probe 256, the pumps 314 and 318 are de-energized. It will be appreciated that the pumps 314 and 318 can be operably connected to the liquid level sensing unit 252 such that the pumps 314, 318 are de-energized automatically when the fluid level in the contaminated solution storage tank falls below the long probe 256. Once the wastewater treatment apparatus 234 has been deactivated, the wastewater treatment apparatus 234 is disconnected from the solution storage tank assembly 232.

When solids need to be removed from the heavy sludge area 368 and the light sludge bin 390, the pump 416 on the cart 406 is operably connected to conduit 374. The valves 376 and 398 are then opened with a switch (not shown) located in the cabinet 326 and the pump 416 is actuated thereby transferring the solids from the heavy sludge area 368 and the light sludge bin 390 to the disposal container 414.

In a similar manner, when solids need to be removed from the contaminated solution storage tank 236 and the treated solution storage tank 238, the pump 416 on the cart 406 is operably connected to conduit 306. The valves 262 and 304 are then manually opened and the pump 416 is actuated thereby transferring the solids from the contaminated solution storage tank 236 and the treated solution storage tank 238 to the disposal container 414.

It will be appreciated by those skilled in the art that the contaminated cleaning solution can be treated with the portable wastewater treatment apparatus 234 by connecting the wastewater treatment apparatus 234 directly to the reservoir 226 of the parts washer assembly 222, without employing the cleaning solution storage tank assembly 232, and continuously circulating the contaminated cleaning solution between the wastewater treatment apparatus 232 and the reservoir 226 of the parts washer assembly 222 until the cleaning solution is sufficiently free of oils, particular matter, and dissolved heavy materials. While this procedure will effectively treat contaminated cleaning solution, it does result in a longer downtime of the parts washer assembly as the parts washer assembly is taken out of operation as the cleaning solution is being treated.

The wastewater treatment assembly 220 described above provides several advantages. First, the wastewater treatment assembly 220 provides an apparatus for removing contaminants from wastewater to produce a solution suitable for recycle. Thus, manufacturing plants and remanufacturing plants which often employ numerous parts washer assemblies will decrease costs of waste disposal, including surcharges and fines connected with the disposal of contaminants, and costs of water and detergent consumption. Second, the fact that the wastewater treatment apparatus 234 is portable enables a manufacturing plant to selectively treat the cleaning solution of several parts washer assemblies at the plant personnel's convenience without disrupting production. With use of the present invention, the only downtime of the parts washer assemblies is when cleaning solution is being transferred between parts washer assembly and the cleaning solution storage tank assembly. Otherwise, the parts washer assembly can be operated in a normal manner, including the period during which contaminated cleaning solution is being treated.

Changes may be made in the construction and the operation of the various components, elements and assemblies described herein and changes may be made in the steps or the sequence of steps of the methods described herein without departing from the spirit and scope of the invention as defined in the following claims.

What is claimed:

1. A method for recycling a contaminated aqueous surfactant solution of a parts washer assembly, comprising the steps of:
   (a) passing the contaminated aqueous surfactant solution from the parts washer assembly into a mixing zone in a housing;
   (b) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;
   (c) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;
   (d) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;
   (e) passing the treated aqueous surfactant solution from the quiescent zone into a discharge zone in the housing; and
   (f) passing the treated aqueous surfactant solution from the discharge zone to the parts washer assembly.

2. The method of claim 1 further comprising the steps of:
   repeating steps (a)–(f) until the treated aqueous surfactant solution is substantially free of oils, particulate matter and dissolved heavy metals.

3. The method of claim 1 further comprising the step of:
   introducing a chemical treating agent into the aqueous surfactant solution prior to the aqueous surfactant solution being introduced into the mixing zone.

4. The method of claim 1 further comprising the step of:
   passing the heavy sludge from the housing to a disposal container.

5. The method of claim 1 further comprising the step of:
   skimming the light sludge from the housing; and
   passing the light sludge from the housing to a disposal container.

6. The method of claim 1 further comprising the step of:
   withdrawing solids remaining in the parts washer assembly from the parts washer assembly and passing the solids to a disposal container.

7. A method for recycling a contaminated aqueous surfactant solution of a parts washer assembly, comprising the steps of:
   (a) passing the contaminated aqueous surfactant solution from the parts washer assembly to a contaminated solution storage tank;
   (b) accumulating a volume of the contaminated aqueous surfactant solution in the contaminated solution storage tank;
   (c) passing the accumulated contaminated aqueous surfactant solution from the contaminated solution storage tank into a mixing zone in a housing;
   (d) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;
   (e) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;
   (f) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;

(g) passing the treated aqueous surfactant solution from the quiescent zone into a discharge zone in the housing; and (h) passing the treated aqueous surfactant solution from the discharge zone to a treated aqueous surfactant solution storage tank.

8. The method of claim 7 further comprising the steps of:
prior to step (h), passing the treated aqueous surfactant solution from the discharge zone of the housing to the contaminated solution storage tank;
repeating steps (c)–(g) and (i) until the treated aqueous surfactant is substantially free of oils, particulate matter and dissolved heavy metals; and
passing the treated aqueous surfactant solution to the treated solution storage tank.

9. The method of claim 7 further comprising the step of:
introducing a chemical treating agent into the aqueous surfactant solution prior to the aqueous surfactant solution being introduced into the mixing zone.

10. The method of claim 7 further comprising the step of:
passing the heavy sludge from the housing to a disposal container.

11. The method of claim 7 further comprising the step of:
skimming the light sludge from the housing; and
passing the light sludge from the housing to a disposal container.

12. The method of claim 7 further comprising the step of:
withdrawing solids remaining in the contaminated solution storage tank from the contaminated solution storage tank and passing the solids to a disposal container.

13. The method of claim 7 further comprising the step of:
withdrawing solids remaining in the treated solution storage tank from the treated solution storage tank and passing the solids to a disposal container.

14. The method of claim 7 further comprising the step of:
withdrawing solids remaining in the contaminated solution storage tanks and the treated solution storage tanks from the contaminated solution storage tanks and the treated solution storage tanks and passing the solids to a disposal container.

15. The method of claim 7 further comprising the step of:
withdrawing solids remaining in the parts washer assembly from the parts washer assembly and passing the solids to a disposal container.

16. The method of claim 7 further comprising the steps of:
monitoring the amount of the aqueous surfactant solution accumulated in the contaminated solution storage tank; and
selectively passing the accumulated aqueous solution from the contaminated solution storage tank to the housing when a predetermined amount of aqueous surfactant solution has accumulated in the contaminated solution storage tank.

17. The method of claim 7 further comprising the steps of:
injecting a volume of treated aqueous surfactant solution from the treated solution storage tank into the parts washer assembly at a sufficient pressure to flush the parts washer assembly;
passing the flushing aqueous surfactant solution from the parts washer assembly to the contaminated solution storage tank; and
passing a volume of the treated aqueous surfactant solution suitable for operating the parts washer assembly from the treated solution storage tank to the parts washer assembly.

18. The method of claim 7 further comprising the steps of:
operating the parts washer assembly; and
concurrently passing the accumulated aqueous surfactant solution from the contaminated solution storage tank into the mixing zone such that the parts washer assembly is operating while the aqueous surfactant solution is being passed through the housing.

19. A method for recycling a contaminated aqueous surfactant solution of a parts washer assembly, comprising the steps of:

(a) passing the contaminated aqueous surfactant solution from the parts washer assembly to a contaminated solution storage tank;

(b) accumulating a volume of the contaminated aqueous surfactant solution in the contaminated solution storage tank;

(c) selectively connecting a portable housing having a fluid inlet and a fluid outlet to the contaminated solution storage tank and a treated solution storage tank such that the fluid inlet of the housing is in fluid communication with the contaminated solution storage tank and the fluid outlet of the housing is in fluid communication with the treated solution storage tank, the housing having a mixing zone, a quiescent zone and a discharge zone;

(d) passing the accumulated contaminated aqueous surfactant solution from the contaminated solution storage tank into the mixing zone of the housing via the fluid inlet;

(e) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(f) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;

(g) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;

(h) passing the treated aqueous surfactant solution from the quiescent zone into the discharge zone; and (i) passing the treated aqueous surfactant solution from the discharge zone to the treated solution storage tank.

20. The method of claim 19 further comprising the steps of:

(j) connecting the discharge zone of the housing to the contaminated solution storage tank such that the fluid outlet of the housing is in fluid communication with the contaminated solution storage tank;

(k) prior to step (i), passing the treated aqueous surfactant solution from the discharge zone to the contaminated solution storage tank;

(l) repeating steps (c)–(h) and (k) until the treated aqueous surfactant solution is substantially free of oils, particulate matter and dissolved heavy metals; and (m) passing the treated aqueous surfactant solution to the treated solution storage tank.

21. The method of claim 19 further comprising the step of:
introducing a chemical treating agent into the aqueous surfactant solution prior to the aqueous surfactant solution being introduced into the mixing zone.

22. The method of claim 19 further comprising the step of:
selectively passing the heavy sludge from the housing to a disposal container.

23. The method of claim 19 further comprising the step of: skimming the light sludge from the quiescent zone; and selectively passing the light sludge to a disposal container.

24. The method of claim 19 further comprising the step of:
selectively passing solids disposed in the contaminated solution storage tank from the contaminated solution storage tank to a disposal container.

25. The method of claim 19 further comprising the step of:
selectively passing solids disposed in the treated solution storage tank from the treated solution storage tank to a disposal container.

26. The method of claim 19 further comprising the step of:
selectively passing solids disposed in the contaminated solution and treated solution storage tanks from the contaminated solution and treated solution storage tanks to a disposal container.

27. The method of claim 19 further comprising the step of:
selectively passing solids disposed in the parts washer assembly from the parts washer assembly to a disposal container.

28. The method of claim 19 further comprising the steps of:
monitoring the amount of the aqueous surfactant solution accumulated in the contaminated solution storage tank; and
selectively passing the accumulated aqueous solution from the contaminated solution storage tank to the housing when a predetermined amount of aqueous surfactant solution has accumulated in the contaminated solution storage tank.

29. The method of claim 19 further comprising the steps of:
injecting a volume of treated aqueous surfactant solution from the treated solution storage tank into the parts washer assembly at a sufficient pressure to flush the parts washer assembly;
passing the flushing aqueous surfactant solution from the parts washer assembly to the contaminated solution storage tank; and
passing a volume of the treated aqueous surfactant solution suitable for operating the parts washer assembly from the treated solution storage tank to the parts washer assembly.

30. The method of claim 19 further comprising the steps of:
operating the parts washer assembly; and
concurrently passing the accumulated aqueous surfactant solution from the contaminated solution storage tank into the mixing zone such that the parts washer assembly is operating while the aqueous surfactant solution is being passed through.

31. A method for recycling contaminated aqueous surfactant solution from a plurality of parts washer assemblies, comprising the steps of:
(a) providing each of the parts washer assemblies with a contaminated solution storage tank and a treated solution storage tank wherein the contaminated solution storage tank and the treated solution storage tank are in fluid communication with the parts washer assembly;
(b) selectively passing the contaminated aqueous surfactant solution from each of the parts washer assemblies to the contaminated solution storage tank in fluid communication therewith;
(c) accumulating a volume of the contaminated aqueous surfactant solution in the contaminated solution storage tanks;
(d) selectively connecting a portable housing having a fluid inlet and a fluid outlet to one of the contaminated solution storage tanks and the adjacent treated solution storage tank such that the fluid inlet of the housing is in fluid communication with the contaminated solution storage tank and the fluid outlet of the housing is in fluid communication with the treated solution storage tank, the housing having a mixing zone, a quiescent zone and a discharge zone;
(e) passing the accumulated contaminated aqueous surfactant solution from the contaminated solution storage tank into the mixing zone of the housing via the fluid inlet;
(f) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;
(g) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;
(h) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;
(i) passing the treated aqueous surfactant solution from the quiescent zone into the discharge zone;
(j) passing the treated aqueous surfactant solution from the discharge zone to the treated solution storage tank; and
(k) repeating steps (d)–(j) for the contaminated solution storage tanks of each parts washer assembly.

32. The method of claim 31 further comprising the steps of:
(l) connecting the discharge zone of the housing to the contaminated solution storage tank such that the fluid outlet of the housing is in fluid communication with the contaminated solution storage tank;
(m) prior to step (j), passing the treated aqueous surfactant solution from the discharge zone to the contaminated solution storage tank;
(n) repeating steps (d)–(i) and (m) until the treated aqueous surfactant solution is substantially free of oils, particulate matter and dissolved heavy metals; and
(o) passing the treated aqueous surfactant solution to the treated solution storage tank.

33. The method of claim 31 further comprising the step of:
introducing a chemical treating agent into the aqueous surfactant solution prior to the aqueous surfactant solution being introduced into the mixing zone.

34. The method of claim 31 further comprising the step of:
selectively passing the heavy sludge from the housing to a disposal container.

35. The method of claim 31 further comprising the steps of:
skimming the light sludge from the quiescent zone; and
selectively passing the light sludge to a disposal container.

36. The method of claim 31 further comprising the step of:
selectively passing solids disposed in the contaminated solution storage tank from the contaminated solution storage tank to a disposal container.

37. The method of claim 31 further comprising the step of:
selectively passing solids disposed in the treated solution storage tank from the treated solution storage tank to a disposal container.

38. The method of claim 31 further comprising the step of:
selectively passing solids disposed in the contaminated solution and treated solution storage tanks from the contaminated solution and treated solution storage tanks to a disposal container.

39. The method of claim 31 further comprising the step of:
selectively passing solids disposed in the parts washer assemblies from the parts washer assemblies to a disposal container.

40. The method of claim 31 further comprising the steps of:
monitoring the amount of the aqueous surfactant solution accumulated in the contaminated solution storage tank; and
selectively passing the accumulated aqueous solution from the contaminated solution storage tank to the housing when a predetermined amount of aqueous surfactant solution has accumulated in the contaminated solution storage tank.

41. The method of claim 31 further comprising the steps of:
injecting a volume of treated aqueous surfactant solution from the treated solution storage tank into the parts washer assembly at a sufficient pressure to flush the parts washer assembly;
passing the flushing aqueous surfactant solution from the parts washer assembly to the contaminated solution storage tank; and
passing a volume of the treated aqueous surfactant solution suitable for operating the parts washer assembly from the treated solution storage tank to the parts washer assembly.

42. The method of claim 31 further comprising the steps of:
operating the parts washer assembly; and
concurrently passing the accumulated aqueous surfactant solution from the contaminated solution storage tank into the mixing zone such that the parts washer assembly is operating while the aqueous surfactant solution is being passed through.

43. The method of claim 1 further comprising the steps of:
prior to step (f), recovering the treated aqueous surfactant solution from the discharge zone of the housing; and
repeating steps (b)–(e) until the treated aqueous surfactant solution is substantially free of oils, particulate matter and dissolved heavy metals.

44. The method of claim 43 further comprising the step of:
introducing a chemical treating agent into the contaminated aqueous surfactant solution prior to the aqueous surfactant solution being introduced into the mixing zone.

45. The method of claim 43 further comprising the step of:
passing the heavy sludge from the housing to a disposal container.

46. The method of claim 43 further comprising the step of:
skimming the light sludge from the housing; and
passing the light sludge from the housing to a disposal container.

47. The method of claim 43 further comprising the step of:
withdrawing solids remaining in the parts washer assembly from the parts washer assembly and passing the solids to a disposal container.

48. A method for recycling a contaminated aqueous surfactant solution of an apparatus comprising the steps of:
(a) passing the contaminated aqueous surfactant solution from the apparatus to a contaminated solution storage tank;
(b) accumulating a volume of the contaminated aqueous surfactant solution in the contaminated solution storage tank;
(c) passing the accumulated contaminated aqueous surfactant solution from the contaminated solution storage tank into a mixing zone in a housing;
(d) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;
(e) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;
(f) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;
(g) passing the treated aqueous surfactant solution from the quiescent zone into a discharge zone in the housing; and
(h) passing the treated aqueous surfactant solution from the discharge zone to a treated aqueous surfactant solution storage tank.

49. The method of claim 48 further comprising the steps of:
prior to step (h), passing the treated aqueous surfactant solution from the discharge zone of the housing to the contaminated solution storage tank;
repeating steps (c)–(g) and (i) until the treated aqueous surfactant is substantially free of oils, particulate matter and dissolved heavy metals; and
passing the treated aqueous surfactant solution to the treated solution storage tank.

50. The method of claim 48 further comprising the step of:
introducing a chemical treating agent into the contaminated aqueous surfactant solution prior to the contaminated aqueous surfactant solution being introduced into the mixing zone.

51. The method of claim 48 further comprising the step of:
passing the heavy sludge from the housing to a disposal container.

52. The method of claim 48 further comprising the step of:

skimming the light sludge from the housing; and passing the light sludge from the housing to a disposal container.

53. The method of claim 48 further comprising the step of:

withdrawing solids remaining in the contaminated solution storage tank from the contaminated solution storage tank and passing the solids to a disposal container.

54. The method of claim 48 further comprising the step of:

withdrawing solids remaining in the treated solution storage tank from the treated solution storage tank and passing the solids to a disposal container.

55. The method of claim 48 further comprising the step of:

withdrawing solids remaining in the contaminated solution storage tanks and the treated solution storage tanks from the contaminated solution storage tanks and the treated solution storage tanks and passing the solids to a disposal container.

56. The method of claim 48 further comprising the step of:

withdrawing solids remaining in the apparatus from the apparatus and passing the solids to a disposal container.

57. The method of claim 48 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

58. The method of claim 48 further comprising the steps of:

injecting a volume of treated aqueous surfactant solution from the treated solution storage tank into the apparatus at a sufficient pressure to flush the apparatus;

passing the flushing aqueous surfactant solution from the apparatus to the contaminated solution storage tank; and passing a volume of the treated aqueous surfactant solution suitable for operating the apparatus from the treated solution storage tank to the apparatus.

59. The method of claim 48 further comprising the steps of:

operating the apparatus; and concurrently passing the accumulated contaminated aqueous surfactant solution from the contaminated solution storage tank into the mixing zone of the housing such that the apparatus is operating while the contaminated aqueous surfactant solution is being passed through the housing.

60. A method for recycling a contaminated aqueous surfactant solution of an apparatus comprising the steps of:

(a) passing the contaminated aqueous surfactant solution from the apparatus to a contaminated solution storage tank;

(b) accumulating a volume of the contaminated aqueous surfactant solution in the contaminated solution storage tank;

(c) selectively connecting a portable housing having a fluid inlet and a fluid outlet to the contaminated solution storage tank and a treated solution storage tank such that the fluid inlet of the housing is in fluid communication with the contaminated solution storage tank and the fluid outlet of the housing is in fluid communication with the treated solution storage tank, the housing having a mixing zone, a quiescent zone and a discharge zone;

(d) passing the accumulated contaminated aqueous surfactant solution from the contaminated solution storage tank into the mixing zone of the housing via the fluid inlet;

(e) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(f) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;

(g) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;

(h) passing the treated aqueous surfactant solution from the quiescent zone into the discharge zone; and (i) passing the treated aqueous surfactant solution from the discharge zone to the treated solution storage tank.

61. The method of claim 60 further comprising the steps of:

(j) connecting the discharge zone of the housing to the contaminated solution storage tank such that the fluid outlet of the housing is in fluid communication with the contaminated solution storage tank;

(k) prior to step (i), passing the treated aqueous surfactant solution from the discharge zone to the contaminated solution storage tank;

(l) repeating steps (c)–(h) and (k) until the treated aqueous surfactant solution is substantially free of oils, particulate matter and dissolved heavy metals; and (m) passing the treated aqueous surfactant solution to the treated solution storage tank.

62. The method of claim 60 further comprising the step of:

introducing a chemical treating agent into the contaminated aqueous surfactant solution prior to the contaminated aqueous surfactant solution being introduced into the mixing zone.

63. The method of claim 60 further comprising the step of:

selectively passing the heavy sludge from the housing to a disposal container.

64. The method of claim 60 further comprising the step of:

skimming the light sludge from the quiescent zone; and selectively passing the light sludge to a disposal container.

65. The method of claim 60 further comprising the step of:

selectively passing solids disposed in the contaminated solution storage tank from the contaminated solution storage tank to a disposal container.

66. The method of claim 60 further comprising the step of:

selectively passing solids disposed in the treated solution storage tank from the treated solution storage tank to a disposal container.

27

67. The method of claim 60 further comprising the step of:

selectively passing solids disposed in the contaminated solution and treated solution storage tanks from the contaminated solution and treated solution storage tanks to a disposal container.

68. The method of claim 60 further comprising the step of:

selectively passing solids disposed in the apparatus from the apparatus to a disposal container.

69. The method of claim 60 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

70. The method of claim 60 further comprising the steps of:

injecting a volume of treated aqueous surfactant solution from the treated solution storage tank into the apparatus at a sufficient pressure to flush the apparatus;

passing the flushing aqueous surfactant solution from the apparatus to the contaminated solution storage tank; and passing a volume of the treated aqueous surfactant solution suitable for operating the apparatus from the treated solution storage tank to the apparatus.

71. The method of claim 60 further comprising the steps of:

operating the apparatus; and concurrently passing the accumulated contaminated aqueous surfactant solution from the contaminated solution storage tank into the mixing zone of the housing such that the apparatus is operating while the contaminated aqueous surfactant solution is being passed through.

72. A method for recycling contaminated aqueous surfactant solution from a plurality of apparatus comprising the steps of:

(a) providing each of the apparatus with a contaminated solution storage tank and a treated solution storage tank wherein the contaminated solution storage tank and the treated solution storage tank are in fluid communication with the apparatus;

(b) selectively passing the contaminated aqueous surfactant solution from each of the apparatus to the contaminated solution storage tank in fluid communication therewith;

(c) accumulating a volume of the contaminated aqueous surfactant solution in the contaminated solution storage tanks;

(d) selectively connecting a portable housing having a fluid inlet and a fluid outlet to one of the contaminated solution storage tanks and the adjacent treated solution storage tank such that the fluid inlet of the housing is in fluid communication with the contaminated solution storage tank and the fluid outlet of the housing is in fluid communication with the treated solution storage tank, the housing having a mixing zone, a quiescent zone and a discharge zone;

(e) passing the accumulated contaminated aqueous surfactant solution from the contaminated solution storage tank into the mixing zone of the housing via the fluid inlet;

28

(f) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(g) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;

(h) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;

(i) passing the treated aqueous surfactant solution from the quiescent zone into the discharge zone;

(j) passing the treated aqueous surfactant solution from the discharge zone to the treated solution storage tank; and (k) repeating steps (d)–(j) for the contaminated solution storage tanks of each apparatus.

73. The method of claim 72 further comprising the steps of:

(l) connecting the discharge zone of the housing to the contaminated solution storage tank such that the fluid outlet of the housing is in fluid communication with the contaminated solution storage tank;

(m) prior to step (j), passing the treated aqueous surfactant solution from the discharge zone to the contaminated solution storage tank;

(n) repeating steps (d)–(i) and (m) until the treated aqueous surfactant solution is substantially free of oils, particulate matter and dissolved heavy metals; and (o) passing the treated aqueous surfactant solution to the treated solution storage tank.

74. The method of claim 72 further comprising the step of:

introducing a chemical treating agent into the contaminated aqueous surfactant solution prior to the contaminated aqueous surfactant solution being introduced into the mixing zone.

75. The method of claim 72 further comprising the step of:

selectively passing the heavy sludge from the housing to a disposal container.

76. The method of claim 72 further comprising the steps of:

skimming the light sludge from the quiescent zone; and selectively passing the light sludge to a disposal container.

77. The method of claim 72 further comprising the step of:

selectively passing solids disposed in the contaminated solution storage tank from the contaminated solution storage tank to a disposal container.

78. The method of claim 72 further comprising the step of:

selectively passing solids disposed in the treated solution storage tank from the treated solution storage tank to a disposal container.

79. The method of claim 72 further comprising the step of:

selectively passing solids disposed in the contaminated solution and treated solution storage tanks from the contaminated solution and treated solution storage tanks to a disposal container.

80. The method of claim 72 further comprising the step of:

selectively passing solids disposed in the apparatus from the apparatus to a disposal container.

81. The method of claim 72 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

82. The method of claim 72 further comprising the steps of:

injecting a volume of treated aqueous surfactant solution from the treated solution storage tank into the apparatus at a sufficient pressure to flush the apparatus;

passing the flushing aqueous surfactant solution from the apparatus to the contaminated solution storage tank; and passing a volume of the treated aqueous surfactant solution suitable for operating the apparatus from the treated solution storage tank to the apparatus.

83. The method of claim 72 further comprising the steps of:

operating the apparatus; and concurrently passing the accumulated contaminated aqueous surfactant solution from the contaminated solution storage tank into the mixing zone of the housing such that the apparatus is operating while the aqueous surfactant solution is being passed through.

84. A method for recycling a contaminated aqueous surfactant solution of an apparatus comprising the steps of:

(a) passing the contaminated aqueous surfactant solution from the apparatus into a mixing zone in a housing;

(b) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(c) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;

(d) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;

(e) passing the treated aqueous surfactant solution from the quiescent zone into a discharge zone in the housing; and (f) passing the treated aqueous surfactant solution from the discharge zone to the apparatus.

85. The method of claim 84 further comprising the steps of:

repeating steps (a)–(f) until the treated aqueous surfactant solution is substantially free of oils, particulate matter and dissolved heavy metals.

86. The method of claim 84 further comprising the step of:

introducing a chemical treating agent into the contaminated aqueous surfactant solution prior to the contaminated aqueous surfactant solution being introduced into the mixing zone.

87. The method of claim 84 further comprising the step of:

passing the heavy sludge from the housing to a disposal container.

88. The method of claim 84 further comprising the step of:

skimming the light sludge from the housing; and passing the light sludge from the housing to a disposal container.

89. The method of claim 84 further comprising the step of:

withdrawing solids remaining in the apparatus from the apparatus and passing the solids to a disposal container.

90. The method of claim 84 further comprising the step of:

prior to step (f), recovering the treated aqueous surfactant solution from the discharge zone of the housing and repeating steps (b)–(e) until the treated aqueous surfactant solution is substantially free of oils, particulate matter and dissolved heavy metals.

91. The method of claim 90 further comprising the step of:

introducing a chemical treating agent into the contaminated aqueous surfactant solution prior to the contaminated aqueous surfactant solution being introduced into the mixing zone.

92. The method of claim 90 further comprising the step of:

passing the heavy sludge from the housing to a disposal container.

93. The method of claim 90 further comprising the step of:

skimming the light sludge from the housing; and passing the light sludge from the housing to a disposal container.

94. The method of claim 90 further comprising the step of:

withdrawing solids remaining in the apparatus from the apparatus and passing the solids to a disposal container.

95. A method for recycling a contaminated aqueous surfactant solution of a parts washer assembly, comprising the steps of:

(a) passing the contaminated aqueous surfactant solution from the parts washer assembly into a mixing zone in a housing;

(b) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(c) spraying water onto the contaminated aqueous surfactant solution in the mixing zone so that the sprayed water contacts the large air bubbles formed in the contaminated aqueous surfactant solution in the mixing zone and substantially reduces the size of the large air bubbles in the contaminated aqueous surfactant solution in the mixing zone;

(d) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;

(e) passing the treated aqueous surfactant solution from the quiescent zone into a discharge zone in the housing; and (f) passing the treated aqueous surfactant solution from the discharge zone to a treated aqueous surfactant solution storage tank.

96. The method of claim 95 further comprising the step of:
prior to step (f), recovering the treated aqueous surfactant solution from the discharge zone in the housing and repeating steps (b)–(e) until the treated aqueous surfactant solution is substantially free of oils, particulate matter and dissolved heavy metals.

97. The method of claim 95 further comprising the step of:
introducing a chemical treating agent into the contaminated aqueous surfactant solution prior to the aqueous surfactant solution being introduced into the mixing zone.

98. The method of claim 95 further comprising the step of:
passing the heavy sludge from the housing to a disposal container.

99. The method of claim 95 further comprising the step of:
skimming the light sludge from the housing; and
passing the light sludge from the housing to a disposal container.

100. The method of claim 95 further comprising the step of:
withdrawing solids remaining in the treated solution storage tank from the treated solution storage tank and passing the solids to a disposal container.

101. The method of claim 95 further comprising the step of:
withdrawing solids remaining in the parts washer assembly from the parts washer assembly and passing the solids to a disposal container.

102. The method of claim 95 further comprising the steps of:
injecting a volume of treated aqueous surfactant solution from the treated solution storage tank into the parts washer assembly at a sufficient pressure to flush the parts washer assembly;
removing the flushing aqueous surfactant solution from the parts washer assembly for passage into the mixing zone in the housing; and
passing a volume of the treated aqueous surfactant solution suitable for operating the parts washer assembly from the treated solution storage tank to the parts washer assembly.

103. The method of claim 95 further comprising the steps of:
operating the parts washer assembly; and
concurrently passing the contaminated aqueous surfactant solution from the parts washer assembly into the mixing zone of the housing and treated aqueous surfactant solution from the treated solution storage tank such that the parts washer assembly is operating while the contaminated aqueous surfactant solution is being passed through the housing.

104. A method for recycling a contaminated aqueous surfactant solution of a parts washer assembly, comprising the steps of:

(a) passing the contaminated aqueous surfactant solution from the parts washer assembly into a mixing zone in a housing;

(b) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(c) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;

(d) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;

(e) passing the treated aqueous surfactant solution from the quiescent zone into a discharge zone in the housing; and (f) passing the treated aqueous surfactant solution from the discharge zone to a treated aqueous surfactant solution storage tank.

105. The method of claim 104 further comprising the step of:
prior to step (f), recovering the treated aqueous surfactant solution from the discharge zone in the housing and repeating steps (b)–(e) until the treated aqueous surfactant solution is substantially free of oils, particulate matter and dissolved heavy metals.

106. The method of claim 104 further comprising the step of:
introducing a chemical treating agent into the contaminated aqueous surfactant solution prior to the aqueous surfactant solution being introduced into the mixing zone.

107. The method of claim 104 further comprising the step of:
passing the heavy sludge from the housing to a disposal container.

108. The method of claim 104 further comprising the step of:
skimming the light sludge from the housing; and
passing the light sludge from the housing to a disposal container.

109. The method of claim 104 further comprising the step of:
withdrawing solids remaining in the treated solution storage tank from the treated solution storage tank and passing the solids to a disposal container.

110. The method of claim 104 further comprising the step of:
withdrawing solids remaining in the parts washer assembly from the parts washer assembly and passing the solids to a disposal container.

111. The method of claim 104 further comprising the steps of:
injecting a volume of treated aqueous surfactant solution from the treated solution storage tank into the parts washer assembly at a sufficient pressure to flush the parts washer assembly;
removing the flushing aqueous surfactant solution from the parts washer assembly for passage into the mixing zone in the housing; and
passing a volume of the treated aqueous surfactant solution suitable for operating the parts washer assembly from the treated solution storage tank to the parts washer assembly.

112. The method of claim 104 further comprising the steps of:

operating the parts washer assembly; and concurrently passing contaminated aqueous surfactant solution from the parts washer assembly into the mixing zone and treated aqueous surfactant solution from the treated solution storage tank such that the parts washer assembly is operating while the contaminated aqueous surfactant solution is being passed through the housing.

113. A method for recycling a contaminated aqueous surfactant solution of an apparatus comprising the steps of:

(a) passing the contaminated aqueous surfactant solution from the apparatus into a mixing zone in a housing;

(b) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(c) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;

(d) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;

(e) passing the treated aqueous surfactant solution from the quiescent zone into a discharge zone in the housing; and (f) passing the treated aqueous surfactant solution from the discharge zone to a treated aqueous surfactant solution storage tank.

114. The method of claim 113 further comprising the steps of:

prior to step (f), recovering the treated aqueous surfactant solution from the discharge zone in the housing and repeating steps (b)–(e) until the treated aqueous surfactant solution is substantially free of oils, particulate matter and dissolved heavy metals.

115. The method of claim 113 further comprising the step of:

introducing a chemical treating agent into the contaminated aqueous surfactant solution prior to the contaminated aqueous surfactant solution being introduced into the mixing zone.

116. The method of claim 113 further comprising the step of:

passing the heavy sludge from the housing to a disposal container.

117. The method of claim 113 further comprising the step of:

skimming the light sludge from the housing; and passing the light sludge from the housing to a disposal container.

118. The method of claim 113 further comprising the step of:

withdrawing solids remaining in the treated solution storage tank from the treated solution storage tank and passing the solids to a disposal container.

119. The method of claim 113 further comprising the step of:

withdrawing solids remaining in the apparatus from the apparatus and passing the solids to a disposal container.

120. The method of claim 113 further comprising the steps of:

injecting a volume of treated aqueous surfactant solution from the treated solution storage tank into the apparatus at a sufficient pressure to flush the apparatus;

removing the flushing aqueous surfactant solution from the apparatus for passage into the mixing zone in the housing; and passing a volume of the treated aqueous surfactant solution suitable for operating the apparatus from the treated solution storage tank to the apparatus.

121. The method of claim 113 further comprising the steps of:

operating the parts washer assembly; and concurrently passing contaminated aqueous surfactant solution from the parts washer assembly into the mixing zone of the housing and treated aqueous surfactant solution from the treated solution storage tank such that the parts washer assembly is operating while the aqueous surfactant solution is being passed through the housing.

122. A method for recycling a contaminated aqueous surfactant solution of an apparatus, comprising the steps of:

(a) passing the contaminated aqueous surfactant solution from the apparatus into a mixing zone in a housing;

(b) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(c) spraying water onto the contaminated aqueous surfactant solution in the mixing zone so that the sprayed water contacts the large air bubbles formed in the contaminated aqueous surfactant solution in the mixing zone and substantially reduces the size of the large air bubbles in the contaminated aqueous surfactant solution in the mixing zone;

(d) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;

(e) passing the treated aqueous surfactant solution from the quiescent zone into a discharge zone in the housing; and (f) passing the treated aqueous surfactant solution from the discharge zone to a treated aqueous surfactant solution storage tank.

123. The method of claim 122 further comprising the step of:

prior to step (f), recovering the treated aqueous surfactant solution from the discharge zone in the housing and repeating steps (b)–(e) until the treated aqueous surfactant solution is substantially free of oils, particulate matter and dissolved heavy metals.

124. The method of claim 122 further comprising the step of:

introducing a chemical treating agent into the contaminated aqueous surfactant solution prior to the aqueous surfactant solution being introduced into the mixing zone.

125. The method of claim 122 further comprising the step of:

passing the heavy sludge from the housing to a disposal container.

126. The method of claim 122 further comprising the step of:

skimming the light sludge from the housing; and passing the light sludge from the housing to a disposal container.

127. The method of claim 122 further comprising the step of:

withdrawing solids remaining in the treated solution storage tank from the treated solution storage tank and passing the solids to a disposal container.

128. The method of claim 122 further comprising the step of:

withdrawing solids remaining in the apparatus from the apparatus and passing the solids to a disposal container.

129. The method of claim 122 further comprising the steps of:

injecting a volume of treated aqueous surfactant solution from the treated solution storage tank into the apparatus at a sufficient pressure to flush the apparatus;

removing the flushing aqueous surfactant solution from the apparatus for passage into the mixing zone in the housing; and passing a volume of the treated aqueous surfactant solution suitable for operating the apparatus from the treated solution storage tank to the apparatus.

130. The method of claim 122 further comprising the steps of:

operating the apparatus; and concurrently passing aqueous surfactant solution from the apparatus into the mixing zone of the housing and treated aqueous surfactant solution from the treated solution storage tank such that the apparatus is operating while the aqueous surfactant solution is being passed through the housing.

131. A method for recycling a contaminated aqueous surfactant solution of a parts washer assembly, comprising the steps of:

(a) passing the contaminated aqueous surfactant solution from the parts washer assembly to a contaminated solution storage tank;

(b) accumulating a volume of the contaminated aqueous surfactant solution in the contaminated solution storage tank;

(c) passing the accumulated contaminated aqueous surfactant solution from the contaminated solution storage tank into a mixing zone in a housing;

(d) introducing air into the contaminated aqueous surfactant solution prior to the contaminated aqueous surfactant solution being introduced into the mixing zone in an amount sufficient so that large air bubbles are formed in the aqueous surfactant solution in the mixing zone;

(e) spraying water onto the contaminated aqueous surfactant solution in the mixing zone so that the sprayed water contacts the large air bubbles formed in the contaminated aqueous surfactant solution in the mixing zone and substantially reduces the size of the large air bubbles in the contaminated aqueous surfactant solution in the mixing zone;

(f) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;

(g) passing the treated aqueous surfactant solution from the quiescent zone into a discharge zone in the housing; and (h) recovering the treated aqueous surfactant solution from the discharge zone of the housing for recycle to the parts washer.

132. The method of claim 131 further comprising the steps of:

prior to step (h), (i) passing the treated aqueous surfactant solution from the discharge zone of the housing to the contaminated solution storage tank;

repeating steps (c)–(g) and (i) until the treated aqueous surfactant is substantially free of oils, particulate matter and dissolved heavy metals.

133. The method of claim 131 further comprising the step of:

introducing a chemical treating agent into the aqueous surfactant solution prior to the aqueous surfactant solution being introduced into the mixing zone.

134. The method of claim 131 further comprising the step of:

passing the heavy sludge from the housing to a disposal container.

135. The method of claim 131 further comprising the step of:

skimming the light sludge from the housing; and passing the light sludge from the housing to a disposal container.

136. The method of claim 131 further comprising the step of:

withdrawing solids remaining in the contaminated solution storage tank from the contaminated solution storage tank and passing the solids to a disposal container.

137. The method of claim 131 further comprising the step of:

withdrawing solids remaining in the parts washer assembly from the parts washer assembly and passing the solids to a disposal container.

138. The method of claim 131 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

139. The method of claim 131 further comprising the steps of:

injecting a volume of treated aqueous surfactant solution recovered from the discharge zone of the housing into the parts washer assembly at a sufficient pressure to flush the parts washer assembly;

passing the flushing aqueous surfactant solution from the parts washer assembly to the contaminated solution storage tank; and passing a volume of the treated aqueous surfactant solution suitable for operating the parts washer assembly recovered from the discharge zone of the housing to the parts washer assembly.

140. The method of claim 131 further comprising the steps of:
- operating the parts washer assembly; and
- concurrently passing the accumulated contaminated aqueous surfactant solution from the contaminated solution storage tank into the mixing zone of the housing such that the parts washer assembly is operating while the contaminated aqueous surfactant solution is being passed through the housing.

141. A method for recycling a contaminated aqueous surfactant solution of a parts washer assembly, comprising the steps of:
- (a) passing the contaminated aqueous surfactant solution from the parts washer assembly to a contaminated solution storage tank;
- (b) accumulating a volume of the contaminated aqueous surfactant solution in the contaminated solution storage tank;
- (c) selectively connecting a portable housing having a fluid inlet and a fluid outlet to the contaminated solution storage tank and a treated solution storage tank such that the fluid inlet of the housing is in fluid communication with the contaminated solution storage tank and the fluid outlet of the housing is in fluid communication with the treated solution storage tank, the housing having a mixing zone, a quiescent zone and a discharge zone;
- (d) passing the accumulated contaminated aqueous surfactant solution from the contaminated solution storage tank into the mixing zone of the housing via the fluid inlet;
- (e) introducing air into the contaminated aqueous surfactant solution prior to the aqueous surfactant solution being introduced into the mixing zone in an amount sufficient so that large air bubbles are formed in the contaminated aqueous surfactant solution in the mixing zone;
- (f) spraying water onto the contaminated aqueous surfactant solution in the mixing zone so that the sprayed water contacts the large air bubbles formed in the contaminated aqueous surfactant solution in the mixing zone and substantially reduces the size of the large air bubbles in the contaminated aqueous surfactant solution in the mixing zone;
- (g) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;
- (h) passing the treated aqueous surfactant solution from the quiescent zone into the discharge zone of the housing; and
- (i) recovering the treated aqueous surfactant solution from the discharge zone of the housing for recycle to the parts washer.

142. The method of claim 141 further comprising the steps of:
- (j) connecting the discharge zone of the housing to the contaminated solution storage tank such that the fluid outlet of the housing is in fluid communication with the contaminated solution storage tank;
- (k) prior to step (i), passing the treated aqueous surfactant solution from the discharge zone to the contaminated solution storage tank;
- (l) repeating steps (c)–(h) and (k) until the treated aqueous surfactant solution is substantially free of oils, particulate matter and dissolved heavy metals.

143. The method of claim 141 further comprising the step of:
- introducing a chemical treating agent into the contaminated aqueous surfactant solution prior to the contaminated aqueous surfactant solution being introduced into the mixing zone.

144. The method of claim 141 further comprising the step of:
- selectively passing the heavy sludge from the housing to a disposal container.

145. The method of claim 141 further comprising the step of:
- skimming the light sludge from the quiescent zone; and
- selectively passing the light sludge to a disposal container.

146. The method of claim 141 further comprising the step of:
- selectively passing solids disposed in the contaminated solution storage tank from the contaminated solution storage tank to a disposal container.

147. The method of claim 141 further comprising the step of:
- selectively passing solids disposed in the parts washer assembly from the parts washer assembly to a disposal container.

148. The method of claim 141 further comprising the steps of:
- monitoring the amount of the contaminated aqueous surfactant solution accumulated in the contaminated solution storage tank; and
- selectively passing the accumulated contaminated aqueous surfactant solution from the contaminated solution storage tank to the housing when a predetermined amount of contaminated aqueous surfactant solution has accumulated in the contaminated solution storage tank.

149. The method of claim 141 further comprising the steps of:
- injecting a volume of treated aqueous surfactant solution recovered from the discharge zone of the housing into the parts washer assembly at a sufficient pressure to flush the parts washer assembly;
- passing the flushing aqueous surfactant solution from the parts washer assembly to the contaminated solution storage tank; and
- passing a volume of the treated aqueous surfactant solution suitable for operating the parts washer assembly recovered from the discharge zone of the housing to the parts washer assembly.

150. The method of claim 141 further comprising the steps of:
- operating the parts washer assembly; and
- concurrently passing the accumulated contaminated aqueous surfactant solution from the contaminated solution storage tank into the mixing zone of the housing such that the parts washer assembly is operating while the contaminated aqueous surfactant solution is being passed through the housing.

151. A method for recycling contaminated aqueous surfactant solution from a plurality of parts washer assemblies, comprising the steps of:
- (a) providing each of the parts washer assemblies with a contaminated solution storage tank which is in fluid communication with the parts washer assembly;

39

(b) selectively passing the contaminated aqueous surfactant solution from each of the parts washer assemblies to the contaminated solution storage tank in fluid communication therewith;

(c) accumulating a volume of the contaminated aqueous surfactant solution in the contaminated solution storage tanks;

(d) selectively connecting a portable housing having a fluid inlet and a fluid outlet to one of the contaminated solution storage tanks such that the fluid inlet of the housing is in fluid communication with the contaminated solution storage tank, the housing having a mixing zone, a quiescent zone and a discharge zone;

(e) passing the accumulated contaminated aqueous surfactant solution from the contaminated solution storage tank into the mixing zone of the housing via the fluid inlet;

(f) introducing air into the contaminated aqueous surfactant solution prior to the contaminated aqueous surfactant solution being introduced into the mixing zone of the housing in an amount sufficient so that large air bubbles are formed in the contaminated aqueous surfactant solution in the mixing zone;

(g) spraying water onto the contaminated aqueous surfactant solution in the mixing zone so that the sprayed water contacts the large air bubbles formed in the contaminated aqueous surfactant solution in the mixing zone and substantially reduces the size of the large air bubbles in the contaminated aqueous surfactant solution in the mixing zone;

(h) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;

(i) passing the treated aqueous surfactant solution from the quiescent zone into the discharge zone;

(j) recovering the treated aqueous surfactant solution from the discharge zone in the housing for recycle to the parts washer assembly; and (k) repeating steps (d)–(j) for the contaminated solution storage tanks of each parts washer assembly.

152. The method of claim 151 further comprising the steps of:

(l) connecting the discharge zone of the housing to the contaminated solution storage tank such that the fluid outlet of the housing is in fluid communication with the contaminated solution storage tank;

(m) prior to step (j), passing the treated aqueous surfactant solution from the discharge zone to the contaminated solution storage tank;

(n) repeating steps (d)–(i) and (m) until the treated aqueous surfactant solution is substantially free of oils, particulate matter and dissolved heavy metals.

153. The method of claim 151 further comprising the step of:

introducing a chemical treating agent into the contaminated aqueous surfactant solution prior to the contaminated aqueous surfactant solution being introduced into the mixing zone of the housing.

154. The method of claim 151 further comprising the step of:

selectively passing the heavy sludge from the housing to a disposal container.

40

155. The method of claim 151 further comprising the steps of:

skimming the light sludge from the quiescent zone; and selectively passing the light sludge to a disposal container.

156. The method of claim 151 further comprising the step of:

selectively passing solids disposed in the contaminated solution storage tank from the contaminated solution storage tank to a disposal container.

157. The method of claim 151 further comprising the step of:

selectively passing solids disposed in the parts washer assemblies from the parts washer assemblies to a disposal container.

158. The method of claim 151 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

159. The method of claim 151 further comprising the steps of:

injecting a volume of treated aqueous surfactant solution recovered from the discharge zone of the housing into the parts washer assembly at a sufficient pressure to flush the parts washer assembly;

passing the flushing aqueous surfactant solution from the parts washer assembly to the contaminated solution storage tank; and passing a volume of the treated aqueous surfactant solution suitable for operating the parts washer assembly recovered from the discharge zone of the housing to the parts washer assembly.

160. The method of claim 151 further comprising the steps of:

operating the parts washer assembly; and concurrently passing the accumulated contaminated aqueous surfactant solution from the contaminated solution storage tank into the mixing zone of the housing such that the parts washer assembly is operating while the contaminated aqueous surfactant solution is being passed through the housing.

161. A method for recycling a contaminated aqueous surfactant solution of a parts washer assembly, comprising the steps of:

(a) passing the contaminated aqueous surfactant solution from the parts washer assembly to a contaminated solution storage tank;

(b) accumulating a volume of the contaminated aqueous surfactant solution in the contaminated solution storage tank;

(c) passing the accumulated contaminated aqueous surfactant solution from the contaminated solution storage tank into a mixing zone in a housing;

(d) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(e) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;

(f) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;

(g) passing the treated aqueous surfactant solution from the quiescent zone into a discharge zone in the housing; and (h) recovering the treated aqueous surfactant solution from the discharge zone of the housing for recycle to the parts washer.

162. The method of claim 161 further comprising the steps of:

prior to step (h), (i) passing the treated aqueous surfactant solution from the discharge zone of the housing to the contaminated solution storage tank;

repeating steps (c)–(g) and (i) until the treated aqueous surfactant is substantially free of oils, particulate matter and dissolved heavy metals.

163. The method of claim 161 further comprising the step of:

introducing a chemical treating agent into the contaminated aqueous surfactant solution prior to the contaminated aqueous surfactant solution being introduced into the mixing zone.

164. The method of claim 161 further comprising the step of:

passing the heavy sludge from the housing to a disposal container.

165. The method of claim 161 further comprising the step of:

skimming the light sludge from the housing; and passing the light sludge from the housing to a disposal container.

166. The method of claim 161 further comprising the step of:

withdrawing solids remaining in the contaminated solution storage tank from the contaminated solution storage tank and passing the solids to a disposal container.

167. The method of claim 161 further comprising the step of:

withdrawing solids remaining in the parts washer assembly from the parts washer assembly and passing the solids to a disposal container.

168. The method of claim 161 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

169. The method of claim 161 further comprising the steps of:

injecting a volume of treated aqueous surfactant solution recovered from the discharge zone of the housing into the parts washer assembly at a sufficient pressure to flush the parts washer assembly;

passing the flushing aqueous surfactant solution from the parts washer assembly to the contaminated solution storage tank; and passing a volume of the treated aqueous surfactant solution suitable for operating the parts washer assembly recovered from the discharge zone of the housing to the parts washer assembly.

170. The method of claim 161 further comprising the steps of:

operating the parts washer assembly; and concurrently passing the accumulated contaminated aqueous surfactant solution from the contaminated solution storage tank into the mixing zone of the housing such that the parts washer assembly is operating while the contaminated aqueous surfactant solution is being passed through the housing.

171. A method for recycling a contaminated aqueous surfactant solution of a parts washer assembly, comprising the steps of:

(a) passing the contaminated aqueous surfactant solution from the parts washer assembly to a contaminated solution storage tank;

(b) accumulating a volume of the contaminated aqueous surfactant solution in the contaminated solution storage tank;

(c) selectively connecting a portable housing having a fluid inlet and a fluid outlet to the contaminated solution storage tank and a treated solution storage tank such that the fluid inlet of the housing is in fluid communication with the contaminated solution storage tank and the fluid outlet of the housing is in fluid communication with the treated solution storage tank, the housing having a mixing zone, a quiescent zone and a discharge zone;

(d) passing the accumulated contaminated aqueous surfactant solution from the contaminated solution storage tank into the mixing zone of the housing via the fluid inlet;

(e) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(f) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;

(g) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;

(h) passing the treated aqueous surfactant solution from the quiescent zone into the discharge zone of the housing; and (i) recovering the treated aqueous surfactant solution from the discharge zone of the housing for recycle to the parts washer.

43

172. The method of claim 171 further comprising the steps of:
- (j) connecting the discharge zone of the housing to the contaminated solution storage tank such that the fluid outlet of the housing is in fluid communication with the contaminated solution storage tank;
- (k) prior to step (i), passing the treated aqueous surfactant solution from the discharge zone to the contaminated solution storage tank;
- (l) repeating steps (c)–(h) and (k) until the treated aqueous surfactant solution is substantially free of oils, particulate matter and dissolved heavy metals.

173. The method of claim 171 further comprising the step of:
introducing a chemical treating agent into the contaminated aqueous surfactant solution prior to the contaminated aqueous surfactant solution being introduced into the mixing zone.

174. The method of claim 171 further comprising the step of:
selectively passing the heavy sludge from the housing to a disposal container.

175. The method of claim 171 further comprising the step of:
skimming the light sludge from the quiescent zone; and selectively passing the light sludge to a disposal container.

176. The method of claim 171 further comprising the step of:
selectively passing solids disposed in the contaminated solution storage tank from the contaminated solution storage tank to a disposal container.

177. The method of claim 171 further comprising the step of:
selectively passing solids disposed in the parts washer assembly from the parts washer assembly to a disposal container.

178. The method of claim 171 further comprising the steps of:
monitoring the amount of the contaminated aqueous surfactant solution accumulated in the contaminated solution storage tank; and
selectively passing the accumulated contaminated aqueous surfactant solution from the contaminated solution storage tank to the housing when a predetermined amount of contaminated aqueous surfactant solution has accumulated in the contaminated solution storage tank.

179. The method of claim 171 further comprising the steps of:
injecting a volume of treated aqueous surfactant solution recovered from the discharge zone of the housing into the parts washer assembly at a sufficient pressure to flush the parts washer assembly;
passing the flushing aqueous surfactant solution from the parts washer assembly to the contaminated solution storage tank; and
passing a volume of the treated aqueous surfactant solution suitable for operating the parts washer assembly recovered from the discharge zone of the housing to the parts washer assembly.

180. The method of claim 171 further comprising the steps of:
operating the parts washer assembly; and
concurrently passing the accumulated contaminated aqueous surfactant solution from the contaminated solution storage tank into the mixing zone of the housing such that the parts washer assembly is operating while the contaminated aqueous surfactant solution is being passed through the housing.

181. A method for recycling contaminated aqueous surfactant solution from a plurality of parts washer assemblies, comprising the steps of:
- (a) providing each of the parts washer assemblies with a contaminated solution storage tank which is in fluid communication with the parts washer assembly;
- (b) selectively passing the contaminated aqueous surfactant solution from each of the parts washer assemblies to the contaminated solution storage tank in fluid communication therewith;
- (c) accumulating a volume of the contaminated aqueous surfactant solution in the contaminated solution storage tanks;
- (d) selectively connecting a portable housing having a fluid inlet and a fluid outlet to one of the contaminated solution storage tanks such that the fluid inlet of the housing is in fluid communication with the contaminated solution storage tank, the housing having a mixing zone, a quiescent zone and a discharge zone;
- (e) passing the accumulated contaminated aqueous surfactant solution from the contaminated solution storage tank into the mixing zone of the housing via the fluid inlet;
- (f) introducing air into the contaminated aqueous surfactant solution prior to the contaminated aqueous surfactant solution being introduced into the mixing zone of the housing in an amount sufficient so that large air bubbles are formed in the contaminated aqueous surfactant solution in the mixing zone;
- (g) introducing water into the mixing zone of the housing so that the water contacts the large air bubbles formed in the contaminated aqueous surfactant solution in the mixing zone and substantially reduces the size of the large air bubbles in the contaminated aqueous surfactant solution in the mixing zone;
- (h) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;
- (i) passing the treated aqueous surfactant solution from the quiescent zone into the discharge zone;
- (j) recovering the treated aqueous surfactant solution from the discharge zone in the housing for recycle to the parts washer assembly; and
- (k) repeating steps (d)–(j) for the contaminated solution storage tanks of each parts washer assembly.

182. The method of claim 181 further comprising the steps of:
- (l) connecting the discharge zone of the housing to the contaminated solution storage tank such that the fluid outlet of the housing is in fluid communication with the contaminated solution storage tank;
- (m) prior to step (j), passing the treated aqueous surfactant solution from the discharge zone to the contaminated solution storage tank;
- (n) repeating steps (d)–(i) and (m) until the treated aqueous surfactant solution is substantially free of oils, particulate matter and dissolved heavy metals.

183. The method of claim 181 further comprising the step of:

introducing a chemical treating agent into the contaminated aqueous surfactant solution prior to the contaminated aqueous surfactant solution being introduced into the mixing zone of the housing.

184. The method of claim 181 further comprising the step of:

selectively passing the heavy sludge from the housing to a disposal container.

185. The method of claim 181 further comprising the steps of:

skimming the light sludge from the quiescent zone; and
selectively passing the light sludge to a disposal container.

186. The method of claim 181 further comprising the step of:

selectively passing solids disposed in the contaminated solution storage tank from the contaminated solution storage tank to a disposal container.

187. The method of claim 181 further comprising the step of:

selectively passing solids disposed in the parts washer assemblies from the parts washer assemblies to a disposal container.

188. The method of claim 181 further comprising the steps of:

monitoring the amount of the contaminated aqueous surfactant solution accumulated in the contaminated solution storage tank; and
selectively passing the accumulated contaminated aqueous surfactant solution from the contaminated solution storage tank to the housing when a predetermined amount of contaminated aqueous surfactant solution has accumulated in the contaminated solution storage tank.

189. The method of claim 181 further comprising the steps of:

injecting a volume of treated aqueous surfactant solution recovered from the discharge zone of the housing into the parts washer assembly at a sufficient pressure to flush the parts washer assembly;
passing the flushing aqueous surfactant solution from the parts washer assembly to the contaminated solution storage tank; and
passing a volume of the treated aqueous surfactant solution suitable for operating the parts washer assembly recovered from the discharge zone of the housing to the parts washer assembly.

190. The method of claim 181 further comprising the steps of:

operating the parts washer assembly; and
concurrently passing the accumulated contaminated aqueous surfactant solution from the contaminated solution storage tank into the mixing zone of the housing such that the parts washer assembly is operating while the contaminated aqueous surfactant solution is being passed through the housing.

191. A method for recycling a contaminated aqueous surfactant solution of an apparatus, comprising the steps of:

(a) passing the contaminated aqueous surfactant solution from the apparatus to a contaminated solution storage tank;

(b) accumulating a volume of the contaminated aqueous surfactant solution in the contaminated solution storage tank;

(c) passing the accumulated contaminated aqueous surfactant solution from the contaminated solution storage tank into a mixing zone in a housing;

(d) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(e) spraying water onto the contaminated aqueous surfactant solution in the mixing zone so that the sprayed water contacts the large air bubbles formed in the contaminated aqueous surfactant solution in the mixing zone and substantially reduces the size of the large air bubbles in the contaminated aqueous surfactant solution in the mixing zone;

(f) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;

(g) passing the treated aqueous surfactant solution from the quiescent zone into a discharge zone in the housing; and (h) recovering the treated aqueous surfactant solution from the discharge zone of the housing for recycle to the apparatus.

192. The method of claim 191 further comprising the steps of:

prior to step (h), (i) passing the treated aqueous surfactant solution from the discharge zone of the housing to the contaminated solution storage tank;
repeating steps (c)–(g) and (i) until the treated aqueous surfactant is substantially free of oils, particulate matter and dissolved heavy metals.

193. The method of claim 191 further comprising the step of:

introducing a chemical treating agent into the contaminated aqueous surfactant solution prior to the contaminated aqueous surfactant solution being introduced into the mixing zone.

194. The method of claim 191 further comprising the step of:

passing the heavy sludge from the housing to a disposal container.

195. The method of claim 191 further comprising the step of:

skimming the light sludge from the housing; and
passing the light sludge from the housing to a disposal container.

196. The method of claim 191 further comprising the step of:

withdrawing solids remaining in the contaminated solution storage tank from the contaminated solution storage tank and passing the solids to a disposal container.

197. The method of claim 191 further comprising the step of:

withdrawing solids remaining in the apparatus from the apparatus and passing the solids to a disposal container.

198. The method of claim 191 further comprising the steps of:

monitoring the amount of the contaminated aqueous surfactant solution accumulated in the contaminated solution storage tank; and
selectively passing the accumulated contaminated aqueous surfactant solution from the contaminated solution

47 storage tank to the housing when a predetermined amount of contaminated aqueous surfactant solution has accumulated in the contaminated solution storage tank.

199. The method of claim 191 further comprising the steps of:

injecting a volume of treated aqueous surfactant solution recovered from the discharge zone of the housing into the apparatus at a sufficient pressure to flush the apparatus;

passing the flushing aqueous surfactant solution from the apparatus to the contaminated solution storage tank; and passing a volume of the treated aqueous surfactant solution suitable for operating the apparatus recovered from the discharge zone of the housing to the apparatus.

200. The method of claim 191 further comprising the steps of:

operating the apparatus; and concurrently passing the accumulated contaminated aqueous surfactant solution from the contaminated solution storage tank into the mixing zone of the housing such that the apparatus is operating while the contaminated aqueous surfactant solution is being passed through the housing.

201. A method for recycling a contaminated aqueous surfactant solution of an apparatus, comprising the steps of:

(a) passing the contaminated aqueous surfactant solution from the apparatus to a contaminated solution storage tank;

(b) accumulating a volume of the contaminated aqueous surfactant solution in the contaminated solution storage tank;

(c) selectively connecting a portable housing having a fluid inlet and a fluid outlet to the contaminated solution storage tank and a treated solution storage tank such that the fluid inlet of the housing is in fluid communication with the contaminated solution storage tank and the fluid outlet of the housing is in fluid communication with the treated solution storage tank, the housing having a mixing zone, a quiescent zone and a discharge zone;

(d) passing the accumulated contaminated aqueous surfactant solution from the contaminated solution storage tank into the mixing zone of the housing via the fluid inlet;

(e) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(f) spraying water onto the contaminated aqueous surfactant solution in the mixing zone so that the sprayed water contacts the large air bubbles formed in the contaminated aqueous surfactant solution in the mixing zone and substantially reduces the size of the large air bubbles in the contaminated aqueous surfactant solution in the mixing zone;

(g) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;

48

(h) passing the treated aqueous surfactant solution from the quiescent zone into the discharge zone of the housing; and (i) recovering the treated aqueous surfactant solution from the discharge zone of the housing for recycle to the apparatus.

202. The method of claim 201 further comprising the steps of:

(j) connecting the discharge zone of the housing to the contaminated solution storage tank such that the fluid outlet of the housing is in fluid communication with the contaminated solution storage tank;

(k) prior to step (i), passing the treated aqueous surfactant solution from the discharge zone to the contaminated solution storage tank;

(l) repeating steps (c)–(h) and (k) until the treated aqueous surfactant solution is substantially free of oils, particulate matter and dissolved heavy metals.

203. The method of claim 201 further comprising the step of:

introducing a chemical treating agent into the contaminated aqueous surfactant solution prior to the contaminated aqueous surfactant solution being introduced into the mixing zone.

204. The method of claim 201 further comprising the step of:

selectively passing the heavy sludge from the housing to a disposal container.

205. The method of claim 201 further comprising the step of:

skimming the light sludge from the quiescent zone; and
selectively passing the light sludge to a disposal container.

206. The method of claim 201 further comprising the step of:

selectively passing solids disposed in the contaminated solution storage tank from the contaminated solution storage tank to a disposal container.

207. The method of claim 201 further comprising the step of:

selectively passing solids disposed in the apparatus from the apparatus to a disposal container.

208. The method of claim 201 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

209. The method of claim 201 further comprising the steps of:

injecting a volume of treated aqueous surfactant solution recovered from the discharge zone of the housing into the apparatus at a sufficient pressure to flush the apparatus;

passing the flushing aqueous surfactant solution from the apparatus to the contaminated solution storage tank; and passing a volume of the treated aqueous surfactant solution suitable for operating the apparatus recovered from the discharge zone of the housing to the apparatus.

210. The method of claim 201 further comprising the steps of:

operating the apparatus; and concurrently passing the accumulated contaminated aqueous surfactant solution from the contaminated solution storage tank into the mixing zone of the housing such that the apparatus is operating while the contaminated aqueous surfactant solution is being passed through the housing.

211. A method for recycling contaminated aqueous surfactant solution from a plurality of apparatus, comprising the steps of:

(a) providing each of the apparatus with a contaminated solution storage tank which is in fluid communication with the apparatus;

(b) selectively passing the contaminated aqueous surfactant solution from each of the apparatus to the contaminated solution storage tank in fluid communication therewith;

(c) accumulating a volume of the contaminated aqueous surfactant solution in the contaminated solution storage tanks;

(d) selectively connecting a portable housing having a fluid inlet and a fluid outlet to one of the contaminated solution storage tanks such that the fluid inlet of the housing is in fluid communication with the contaminated solution storage tank, the housing having a mixing zone, a quiescent zone and a discharge zone;

(e) passing the accumulated contaminated aqueous surfactant solution from the contaminated solution storage tank into the mixing zone of the housing via the fluid inlet;

(f) introducing air into the contaminated aqueous surfactant solution prior to the contaminated aqueous surfactant solution being introduced into the mixing zone of the housing in an amount sufficient so that large air bubbles are formed in the contaminated aqueous surfactant solution in the mixing zone;

(g) spraying water onto the contaminated aqueous surfactant solution in the mixing zone so that the sprayed water contacts the large air bubbles formed in the contaminated aqueous surfactant solution in the mixing zone and substantially reduces the size of the large air bubbles in the contaminated aqueous surfactant solution in the mixing zone;

(h) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;

(i) passing the treated aqueous surfactant solution from the quiescent zone into the discharge zone;

(j) recovering the treated aqueous surfactant solution from the discharge zone in the housing for recycle to the apparatus; and (k) repeating steps (d)–(j) for the contaminated solution storage tanks of each apparatus.

212. The method of claim 211 further comprising the steps of:

(l) connecting the discharge zone of the housing to the contaminated solution storage tank such that the fluid outlet of the housing is in fluid communication with the contaminated solution storage tank;

(m) prior to step (j), passing the treated aqueous surfactant solution from the discharge zone to the contaminated solution storage tank;

(n) repeating steps (d)–(i) and (m) until the treated aqueous surfactant solution is substantially free of oils, particulate matter and dissolved heavy metals.

213. The method of claim 212 further comprising the step of:

introducing a chemical treating agent into the contaminated aqueous surfactant solution prior to the contaminated aqueous surfactant solution being introduced into the mixing zone of the housing.

214. The method of claim 212 further comprising the step of:

selectively passing the heavy sludge from the housing to a disposal container.

215. The method of claim 212 further comprising the steps of:

skimming the light sludge from the quiescent zone; and selectively passing the light sludge to a disposal container.

216. The method of claim 212 further comprising the step of:

selectively passing solids disposed in the contaminated solution storage tank from the contaminated solution storage tank to a disposal container.

217. The method of claim 211 further comprising the step of:

selectively passing solids disposed in the apparatus from the apparatus to a disposal container.

218. The method of claim 211 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

219. The method of claim 211 further comprising the steps of:

injecting a volume of treated aqueous surfactant solution recovered from the discharge zone of the housing into the apparatus at a sufficient pressure to flush the apparatus;

passing the flushing aqueous surfactant solution from the apparatus to the contaminated solution storage tank; and passing a volume of the treated aqueous surfactant solution suitable for operating the apparatus recovered from the discharge zone of the housing to the apparatus.

220. The method of claim 211 further comprising the steps of:

operating the apparatus; and concurrently passing the accumulated contaminated aqueous surfactant solution from the contaminated solution storage tank into the mixing zone of the housing such that the apparatus is operating while the contaminated aqueous surfactant solution is being passed through the housing.

221. A method for recycling a contaminated aqueous surfactant solution of an apparatus, comprising the steps of:

(a) passing the contaminated aqueous surfactant solution from the apparatus to a contaminated solution storage tank;

(b) accumulating a volume of the contaminated aqueous surfactant solution in the contaminated solution storage tank;

(c) passing the accumulated contaminated aqueous surfactant solution from the contaminated solution storage tank into a mixing zone in a housing;

(d) introducing air into the contaminated aqueous surfactant solution prior to the contaminated aqueous surfactant solution being introduced into the mixing zone in an amount sufficient so that large air bubbles are formed in the aqueous surfactant solution in the mixing zone;

(e) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;

(f) passing the contaminated aqueous surfactant solution from the mixing zone into a quiescent zone in the housing where the contaminated aqueous surfactant solution is separated into an upper layer containing light sludge, an intermediate layer constituting a treated aqueous surfactant solution and a lower layer containing a heavy sludge;

(g) passing the treated aqueous surfactant solution from the quiescent zone into a discharge zone in the housing; and (h) recovering the treated aqueous surfactant solution from the discharge zone of the housing for recycle to the apparatus.

222. The method of claim 221 further comprising the steps of:

prior to step (h), (i) passing the treated aqueous surfactant solution from the discharge zone of the housing to the contaminated solution storage tank;

repeating steps (c)–(g) and (i) until the treated aqueous surfactant is substantially free of oils, particulate matter and dissolved heavy metals.

223. The method of claim 221 further comprising the step of:

introducing a chemical treating agent into the contaminated aqueous surfactant solution prior to the contaminated aqueous surfactant solution being introduced into the mixing zone.

224. The method of claim 221 further comprising the step of:

passing the heavy sludge from the housing to a disposal container.

225. The method of claim 221 further comprising the step of:

skimming the light sludge from the housing; and passing the light sludge from the housing to a disposal container.

226. The method of claim 221 further comprising the step of:

withdrawing solids remaining in the contaminated solution storage tank from the contaminated solution storage tank and passing the solids to a disposal container.

227. The method of claim 221 further comprising the step of:

withdrawing solids remaining in the apparatus from the apparatus and passing the solids to a disposal container.

228. The method of claim 221 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

229. The method of claim 221 further comprising the steps of:

injecting a volume of treated aqueous surfactant solution recovered from the discharge zone of the housing into the apparatus at a sufficient pressure to flush the apparatus;

passing the flushing aqueous surfactant solution from the apparatus to the contaminated solution storage tank; and passing a volume of the treated aqueous surfactant solution suitable for operating the apparatus recovered from the discharge zone of the housing to the apparatus.

230. The method of claim 221 further comprising the steps of:

operating the apparatus; and concurrently passing the accumulated contaminated aqueous surfactant solution from the contaminated solution storage tank into the mixing zone of the housing such that the apparatus is operating while the contaminated aqueous surfactant solution is being passed through the housing.

231. A method for recycling a contaminated aqueous surfactant solution of an apparatus, comprising the steps of:

(a) passing the contaminated aqueous surfactant solution from the apparatus to a contaminated solution storage tank;

(b) accumulating a volume of the contaminated aqueous surfactant solution in the contaminated solution storage tank;

(c) selectively connecting a portable housing having a fluid inlet and a fluid outlet to the contaminated solution storage tank and a treated solution storage tank such that the fluid inlet of the housing is in fluid communication with the contaminated solution storage tank and the fluid outlet of the housing is in fluid communication with the treated solution storage tank, the housing having a mixing zone, a quiescent zone and a discharge zone;

(d) passing the accumulated contaminated aqueous surfactant solution from the contaminated solution storage tank into the mixing zone of the housing via the fluid inlet;

(e) introducing air into the contaminated aqueous surfactant solution prior to the contaminated aqueous surfactant solution being introduced into the mixing zone in an amount sufficient so that large air bubbles are formed in the contaminated aqueous surfactant solution in the mixing zone;

(f) introducing water into the mixing zone so that the water contacts the large air bubbles formed in the contaminated aqueous surfactant solution in the mixing zone and substantially reduces the size of the large air bubbles in the contaminated aqueous surfactant solution in the mixing zone;

(g) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;

(h) passing the treated aqueous surfactant solution from the quiescent zone into the discharge zone of the housing; and (i) recovering the treated aqueous surfactant solution from the discharge zone of the housing for recycle to the apparatus.

232. The method of claim 231 further comprising the steps of:

(j) connecting the discharge zone of the housing to the contaminated solution storage tank such that the fluid outlet of the housing is in fluid communication with the contaminated solution storage tank;

(k) prior to step (i), passing the treated aqueous surfactant solution from the discharge zone to the contaminated solution storage tank;

(l) repeating steps (c)–(h) and (k) until the treated aqueous surfactant solution is substantially free of oils, particulate matter and dissolved heavy metals.

233. The method of claim 231 further comprising the step of:

introducing a chemical treating agent into the contaminated aqueous surfactant solution prior to the contaminated aqueous surfactant solution being introduced into the mixing zone.

234. The method of claim 231 further comprising the step of:

selectively passing the heavy sludge from the housing to a disposal container.

235. The method of claim 231 further comprising the step of:

skimming the light sludge from the quiescent zone; and selectively passing the light sludge to a disposal container.

236. The method of claim 231 further comprising the step of:

selectively passing solids disposed in the contaminated solution storage tank from the contaminated solution storage tank to a disposal container.

237. The method of claim 231 further comprising the step of:

selectively passing solids disposed in the apparatus from the apparatus to a disposal container.

238. The method of claim 231 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

239. The method of claim 231 further comprising the steps of:

injecting a volume of treated aqueous surfactant solution recovered from the discharge zone of the housing into the apparatus at a sufficient pressure to flush the apparatus;

passing the flushing aqueous surfactant solution from the apparatus to the contaminated solution storage tank; and passing a volume of the treated aqueous surfactant solution suitable for operating the apparatus recovered from the discharge zone of the housing to the apparatus.

240. The method of claim 231 further comprising the steps of:

operating the apparatus; and concurrently passing the accumulated contaminated aqueous surfactant solution from the contaminated solution storage tank into the mixing zone of the housing such that the apparatus is operating while the contaminated aqueous surfactant solution is being passed through the housing.

241. A method for recycling contaminated aqueous surfactant solution from a plurality of apparatus, comprising the steps of:

(a) providing each of the apparatus with a contaminated solution storage tank which is in fluid communication with the apparatus;

(b) selectively passing the contaminated aqueous surfactant solution from each of the apparatus to the contaminated solution storage tank in fluid communication therewith;

(c) accumulating a volume of the contaminated aqueous surfactant solution in the contaminated solution storage tanks;

(d) selectively connecting a portable housing having a fluid inlet and a fluid outlet to one of the contaminated solution storage tanks such that the fluid inlet of the housing is in fluid communication with the contaminated solution storage tank, the housing having a mixing zone, a quiescent zone and a discharge zone;

(e) passing the accumulated contaminated aqueous surfactant solution from the contaminated solution storage tank into the mixing zone of the housing via the fluid inlet;

(f) introducing air into the contaminated aqueous surfactant solution prior to the contaminated aqueous surfactant solution being introduced into the mixing zone of the housing in an amount sufficient so that large air bubbles are formed in the contaminated aqueous surfactant solution in the mixing zone;

(g) introducing water into the mixing zone of the housing so that the water contacts the large air bubbles formed in the contaminated aqueous surfactant solution in the mixing zone and substantially reduces the size of the large air bubbles in the contaminated aqueous surfactant solution in the mixing zone;

(h) passing the contaminated aqueous surfactant solution from the mixing zone into the quiescent zone where the contaminated aqueous surfactant solution is separated into an upper layer containing light sludge, an intermediate layer constituting a treated aqueous surfactant solution and a lower layer containing a heavy sludge;

(i) passing the treated aqueous surfactant solution from the quiescent zone into the discharge zone;

(j) recovering the treated aqueous surfactant solution from the discharge zone in the housing for recycle to the apparatus; and (k) repeating steps (d)–(j) for the contaminated solution storage tanks of each apparatus.

242. The method of claim 241 further comprising the steps of:

(l) connecting the discharge zone of the housing to the contaminated solution storage tank such that the fluid outlet of the housing is in fluid communication with the contaminated solution storage tank;

(m) prior to step (j), passing the treated aqueous surfactant solution from the discharge zone to the contaminated solution storage tank;

(n) repeating steps (d)–(i) and (m) until the treated aqueous surfactant solution is substantially free of oils, particulate matter and dissolved heavy metals.

243. The method of claim 241 further comprising the step of:

introducing a chemical treating agent into the contaminated aqueous surfactant solution prior to the contaminated aqueous surfactant solution being introduced into the mixing zone of the housing.

244. The method of claim 241 further comprising the step of:

selectively passing the heavy sludge from the housing to a disposal container.

245. The method of claim 241 further comprising the steps of:

skimming the light sludge from the quiescent zone; and selectively passing the light sludge to a disposal container.

246. The method of claim 241 further comprising the step of:

selectively passing solids disposed in the contaminated solution storage tank from the contaminated solution storage tank to a disposal container.

247. The method of claim 241 further comprising the step of:

selectively passing solids disposed in the apparatus from the apparatus to a disposal container.

248. The method of claim 241 further comprising the steps of:

monitoring the amount of the contaminated aqueous surfactant solution accumulated in the contaminated solution storage tank; and selectively passing the accumulated contaminated aqueous surfactant solution from the contaminated solution storage tank to the housing when a predetermined amount of contaminated aqueous surfactant solution has accumulated in the contaminated solution storage tank.

249. The method of claim 241 further comprising the steps of:

injecting a volume of treated aqueous surfactant solution recovered from the discharge zone of the housing into the apparatus at a sufficient pressure to flush the apparatus;

passing the flushing aqueous surfactant solution from the apparatus to the contaminated solution storage tank; and passing a volume of the treated aqueous surfactant solution suitable for operating the apparatus recovered from the discharge zone of the housing to the apparatus.

250. The method of claim 241 further comprising the steps of:

operating the apparatus; and concurrently passing the accumulated contaminated aqueous surfactant solution from the contaminated solution storage tank into the mixing zone of the housing such that the apparatus is operating while the contaminated aqueous surfactant solution is being passed through the housing.

* * * * *

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

It is certified that error appears in the above-identified patent and that said Letters Patent is hereby corrected as shown below:

Drawings,
Fig. 1, please insert the numeral -- 30 -- and its associated lead line.

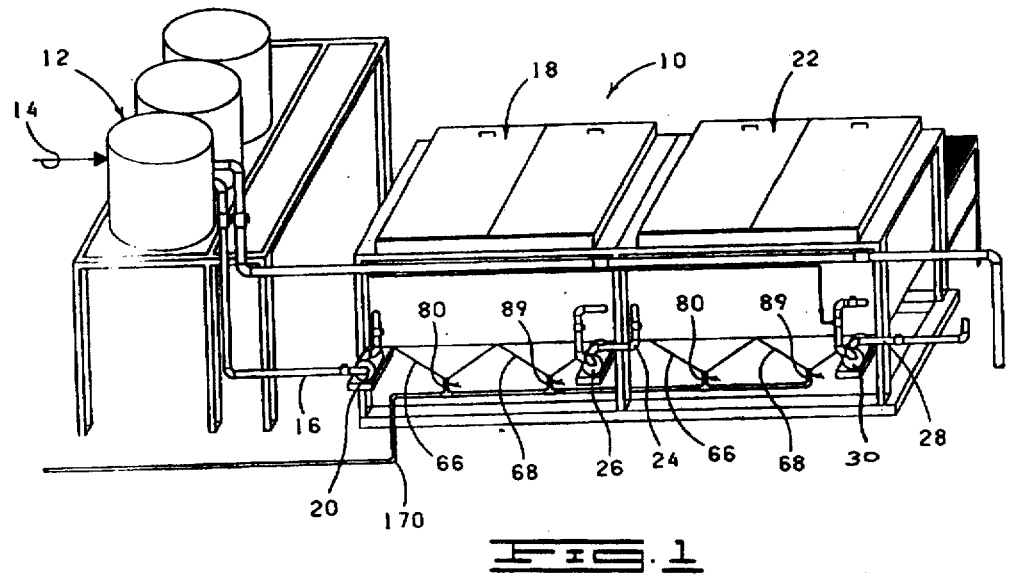

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

It is certified that error appears in the above-identified patent and that said Letters Patent is hereby corrected as shown below:

Fig. 5, delete the word "SYSTEM" and substitute -- SUPPLY -- therefor.

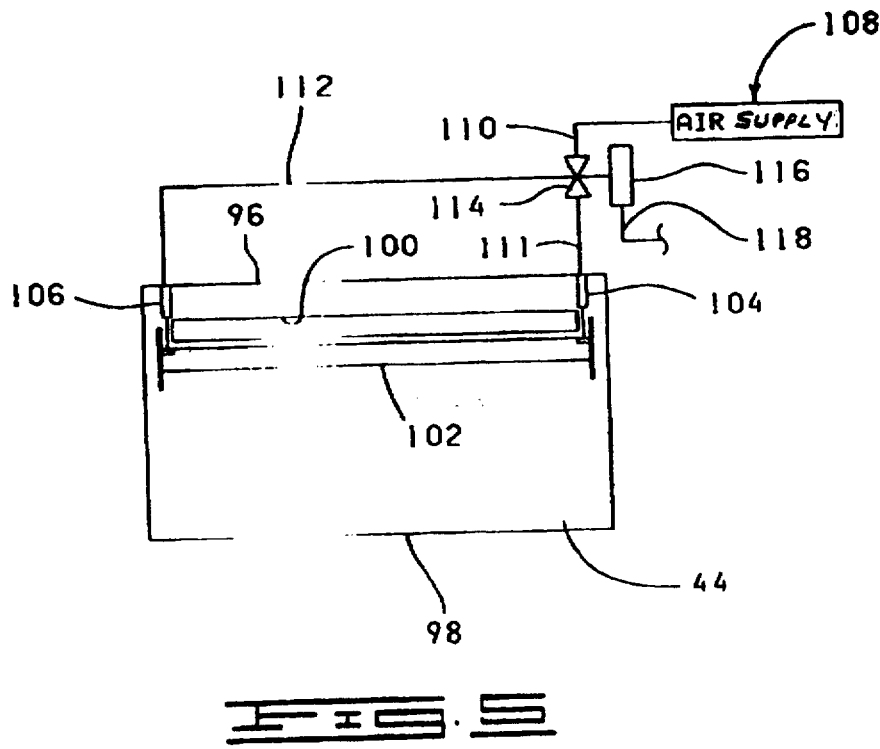

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

Page 3 of 7

It is certified that error appears in the above-identified patent and that said Letters Patent is hereby corrected as shown below:

Fig. 7A, delete the numeral "196" and substitute -- 197 -- therefor.

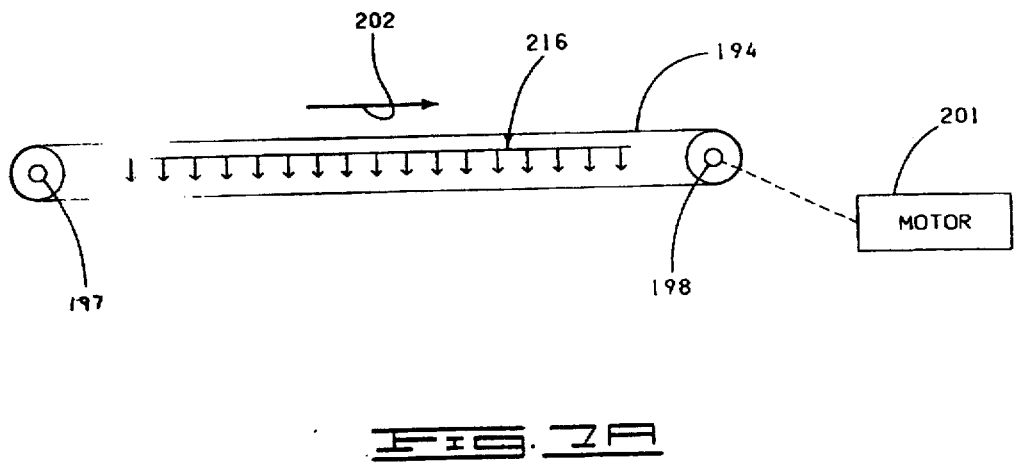

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

It is certified that error appears in the above-identified patent and that said Letters Patent is hereby corrected as shown below:

Fig. 8, please add the numeral -- 328 --, -- 330 --, -- 326 --, and -- 401 -- and each respective lead line.

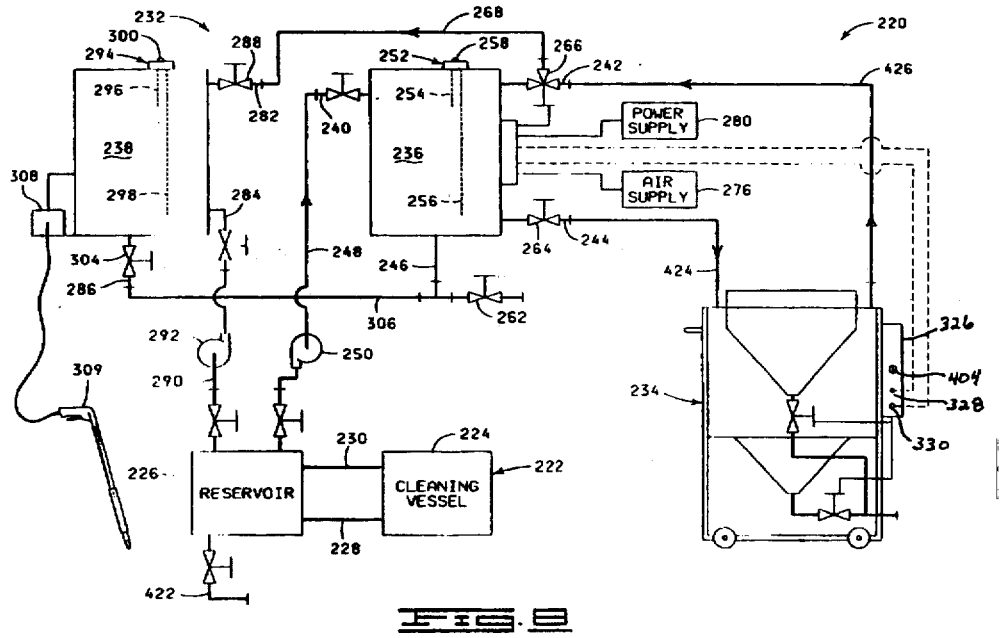

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

Page 5 of 7

It is certified that error appears in the above-identified patent and that said Letters Patent is hereby corrected as shown below:

Fig. 9, please insert the numeral -- 328 -- and its associated lead line.

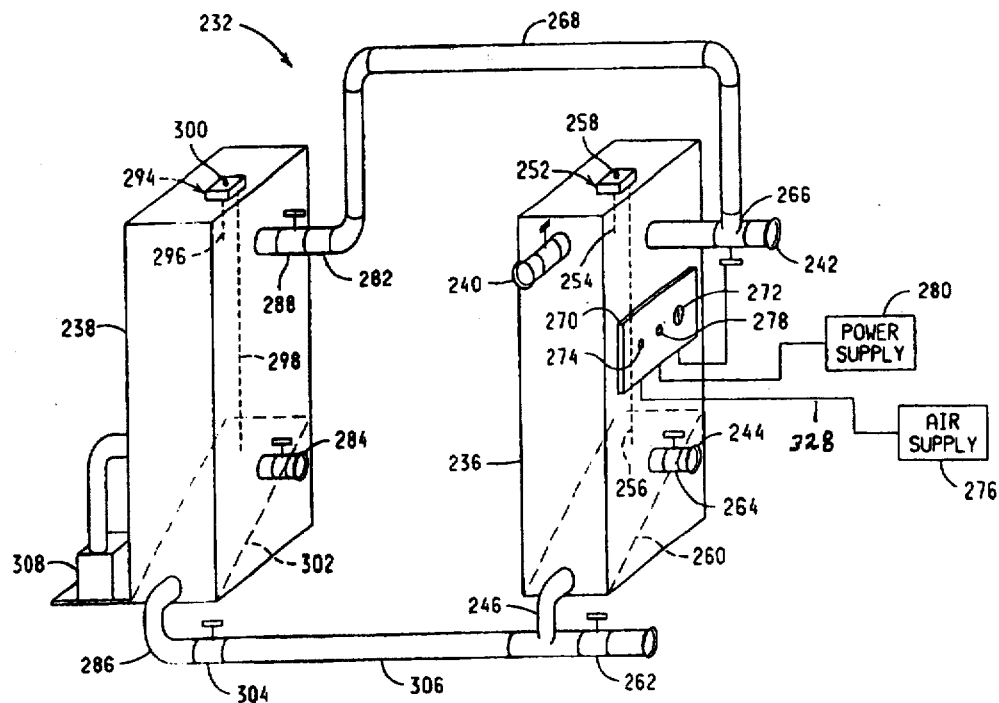

Fig. 9

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

It is certified that error appears in the above-identified patent and that said Letters Patent is hereby corrected as shown below:

Fig. 12, please add the numeral -- 322 -- and associated lead line to designate each roller.

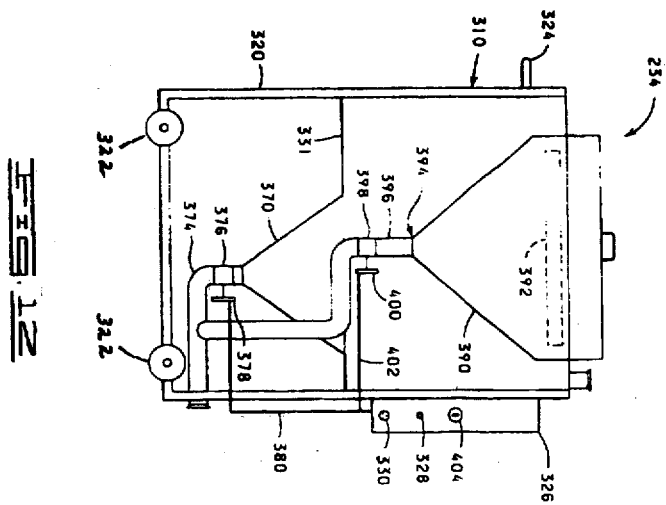

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

It is certified that error appears in the above-identified patent and that said Letters Patent is hereby corrected as shown below:

Fig. 12, please add the numeral -- 322 -- and associated lead line to designate each roller.

Signed and Sealed this

Twentieth Day of November, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

It is certified that error appears in the above-identified patent and that said Letters Patent is hereby corrected as shown below:

Drawings,
Fig. 1, please insert the numeral -- 30 -- and its associated lead line.

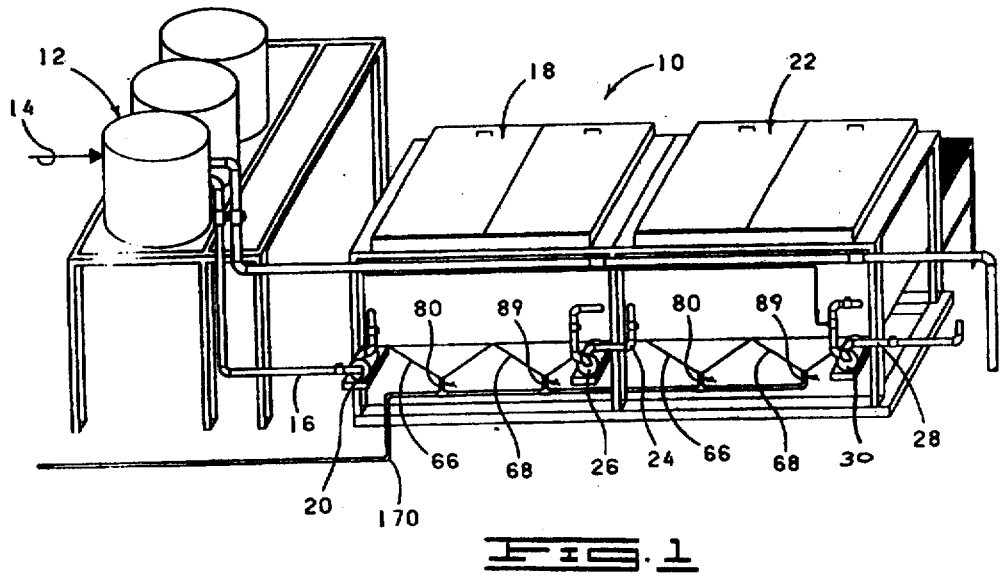

FIG. 1

UNITED STATES PATENT AND TRADEMARK OFFICE
CERTIFICATE OF CORRECTION

PATENT NO. : 5,755,973  Page 2 of 9
DATED : March 26, 1998
INVENTOR(S) : Joseph P. Krieger It is certified that error appears in the above-identified patent and that said Letters Patent is hereby corrected as shown below:

Fig. 5, delete the word "SYSTEM" and substitute -- SUPPLY -- therefor.

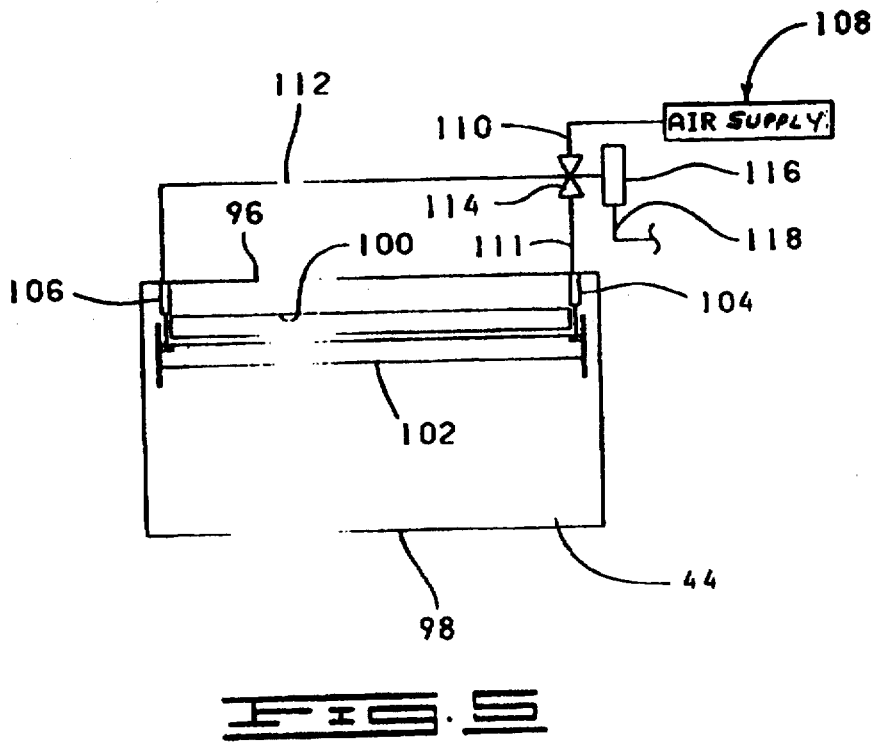

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

Page 3 of 9

It is certified that error appears in the above-identified patent and that said Letters Patent is hereby corrected as shown below:

Fig. 7A, delete the numeral "196" and substitute -- 197 -- therefor.

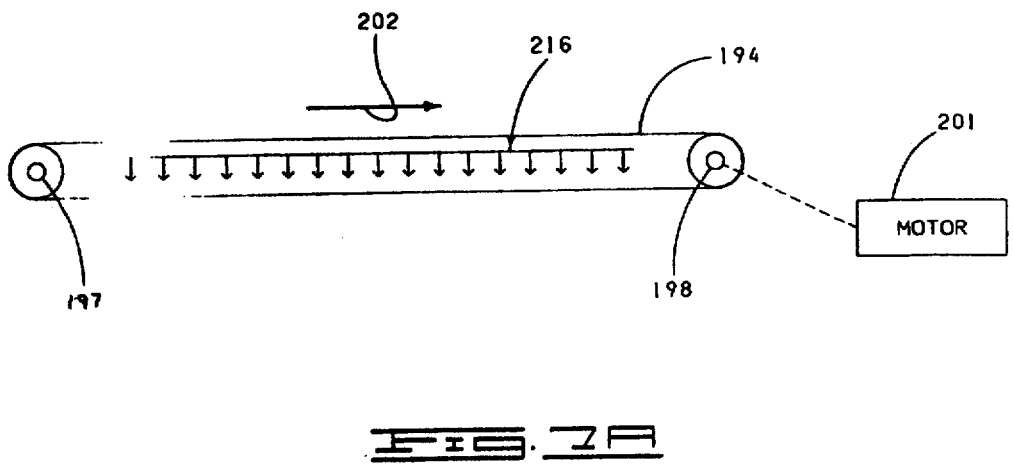

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

It is certified that error appears in the above-identified patent and that said Letters Patent is hereby corrected as shown below:

Fig. 8, please add the numeral -- 328 --, -- 330 --, -- 326 --, and -- 401 -- and each respective lead line.

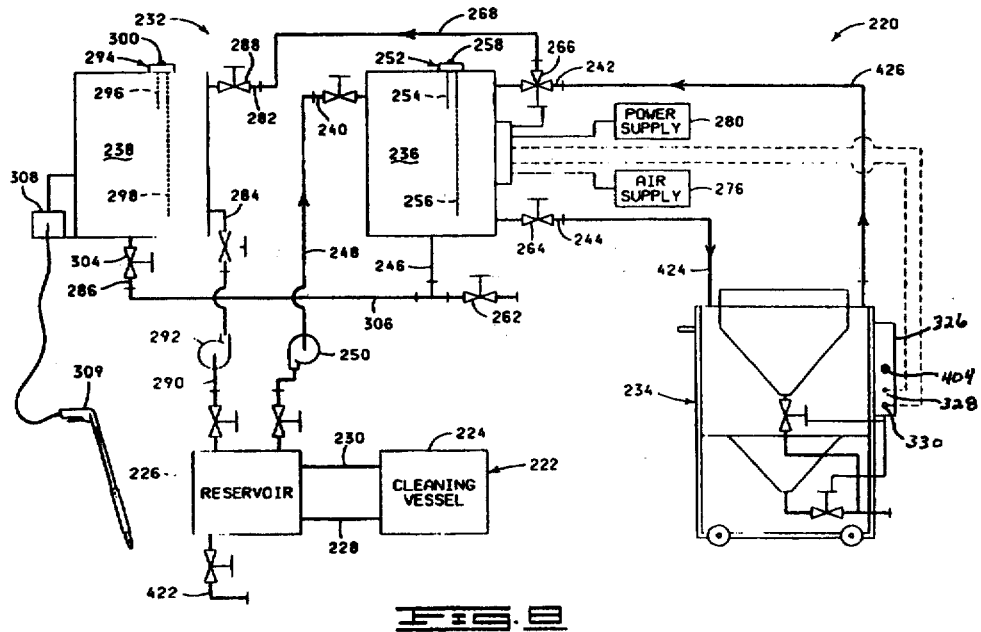

FIG. 8

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

It is certified that error appears in the above-identified patent and that said Letters Patent is hereby corrected as shown below:

Fig. 9, please insert the numeral -- 328 --and its associated lead line.

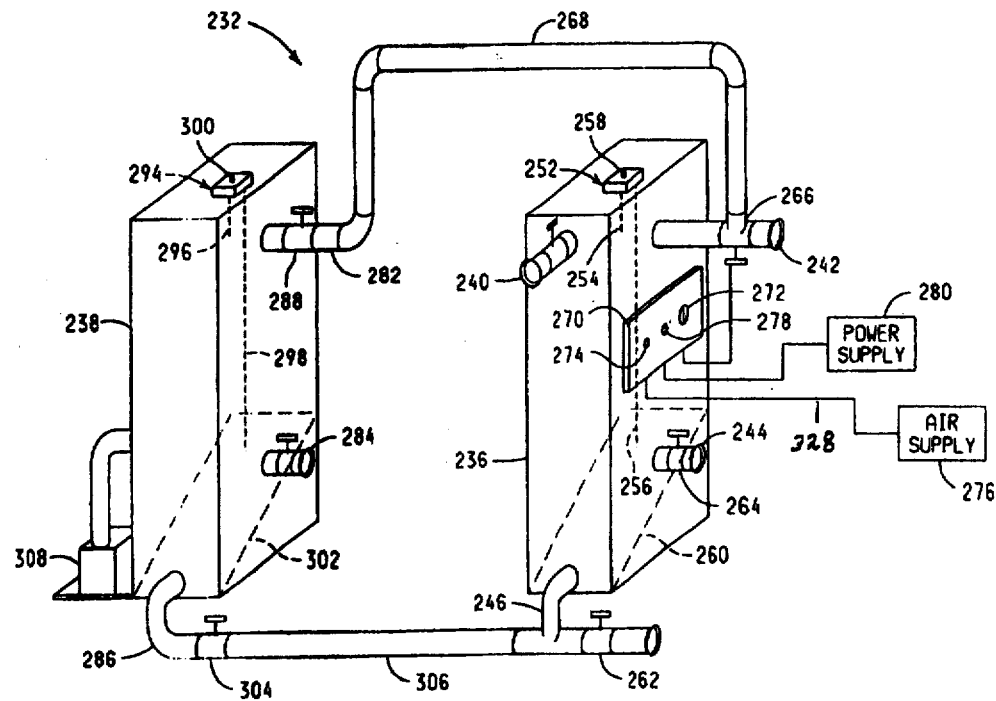

FIG. 9

UNITED STATES PATENT AND TRADEMARK OFFICE
CERTIFICATE OF CORRECTION

PATENT NO.   : 5,755,973
DATED        : March 26, 1998
INVENTOR(S)  : Joseph P. Krieger It is certified that error appears in the above-identified patent and that said Letters Patent is hereby corrected as shown below:

Fig. 12, please add the numeral -- 322 -- and associated lead line to designate each roller.

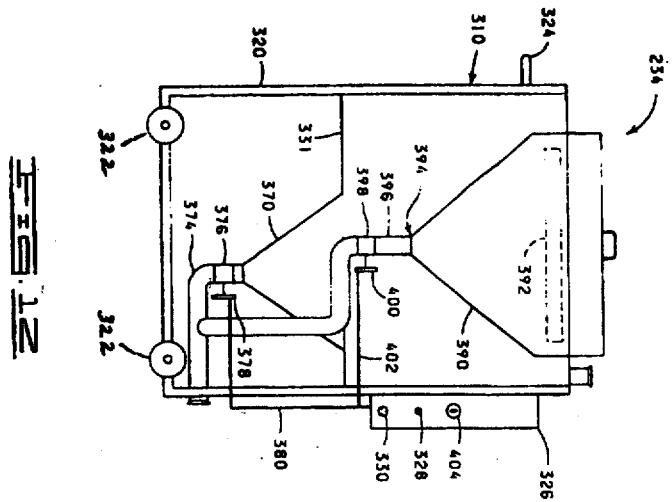

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

Page 7 of 9

It is certified that error appears in the above-identified patent and that said Letters Patent is hereby corrected as shown below:

Column 2:
Line 9, delete "as a" and substitute therefor -- is a --;
Line 21, delete "being" and substitute therefor -- is --;
Line 30, delete the numeral " 20" and substitute therefore -- 22 --;
Line 32, delete the numeral " 20" and substitute therefor -- 22 --;
Line 33, delete the numeral " 20" and substitute therefor -- 22--;
Line 64, after "zone" and before "off" insert -- 42 --;

Column 3,
Line 1, delete "zone." and substitute -- zone 42. -- therefor;
Line 3, after "zone" and before "via" insert -- 42 --;
Line 4, after "zone" and before "is" insert -- 42 --;
Line 7, after "water" and before "sprayed" insert -- is --;
Line 10, delete "zone." and substitute -- zone 42. -- therefor;
Line 15, delete "(FIG. 3)";
Line 38, delete "cell 20." and substitute -- cell 22. --;
Line 44, delete the numeral " 20" and substitute therefore -- 22 --;
Line 63, delete "housing 30" and substitute -- housing 32 -- therefor;
Line 64, delete "area" and substitute -- zone -- therefor;

Column 4,
Line 45, delete "at a" and substitute therefor -- at --;

Column 5,
Line 24, delete "138" and substitute therefor -- 38 --;
Line 35, delete "bar 126" and substitute -- bar 128 -- therefor;
Line 43, delete "idler";
Line 59, delete "(FIG. 6)" and substitute -- (FIG. 4) -- therefor;
Line 61, delete "(FIG. 6)" and substitute -- (FIG. 4) --therefor;

Column 6,
Line 21, delete the numeral "94" and substitute therefor -- 92 --;
Line 58, delete "causes" and substitute -- causing -- therefor;
Line 60, delete "controller" and substitute -- control -- therefor;
Line 64, after "bin" and before "through" insert -- 148 --;

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

It is certified that error appears in the above-identified patent and that said Letters Patent is hereby corrected as shown below:

Column 7,
Line 4, delete "are" and substitute therefor -- is --;
Line 7, delete "are" and substitute therefor -- is --;
Line 20, delete "by the";
Line 40, delete "movable" and substitute -- movably -- therefor;

Column 8,
Line 8, delete "land fills" and substitute -- landfills -- therefor;
Line 12, delete "land fill." and substitute -- landfill. -- therefor;
Line 28, delete "bins" and substitute -- tanks -- therefor;
Line 29, delete "the thickening" and substitute therefor -- thickening --;
Line 31, after 'IF' and before "high" insert -- there is a --;
Line 32, delete "bins" and substitute -- tanks --therefor;
Line 33, delete "bins" and substitute -- tanks -- therefor;

Column 11,
Line 36, delete the numeral "20" and substitute therefor -- 22 --;
Line 48, after "330," and before "an" insert -- and --;

Column 12,
Line 32, delete "FIG. 10," and substitute -- FIGS. 9 and 10, -- therefor;
Line 51, after "366" and before "which" insert -- (FIG. 10) --;
Line 52, delete "supply." and substitute -- supply (not shown). -- therefor;

Column 13,
Line 14, after "bottom" and before "of 'insert -- 331 --;
Line 17, delete "housing 32." and substitute -- housing 310. -- therefor;
Line 28, delete "baffles 44 and 48" and substitute therefore -- baffles 344 and 340 -- therefor;
Line 55, delete "cell 18 and 20" and substitute therefor -- cells 18 and 22 --;

Column 14,
Line 19, delete "a an" and substitute -- an -- therefor;
Line 35, after "agent "and before "pump" insert -- injection --;
Line 40, after "chemical" and before "injection" insert -- treating agent --;

UNITED STATES PATENT AND TRADEMARK OFFICE
CERTIFICATE OF CORRECTION

PATENT NO. : 5,755,973
DATED : March 26, 1998
INVENTOR(S) : Joseph P. Krieger

It is certified that error appears in the above-identified patent and that said Letters Patent is hereby corrected as shown below:

Column 15,
Line 51, after "424" and before "is" insert -- (FIG. 8) --;

Column 17,
Line 22, delete "apparatus 232" and substitute therefor -- apparatus 234 --;

Signed and Sealed this

Twenty-seventh Day of November, 2001

*Attest:*

*Attesting Officer*

NICHOLAS P. GODICI
*Acting Director of the United States Patent and Trademark Office*